(12) United States Patent
Emmanuel et al.

(10) Patent No.: US 12,556,714 B2
(45) Date of Patent: Feb. 17, 2026

(54) CAMERA COMMUNICATION CHANNEL SELECTION

(71) Applicant: ARLO TECHNOLOGIES, INC., Carlsbad, CA (US)

(72) Inventors: Joseph Amalan Arul Emmanuel, Cupertino, CA (US); Peiman Amini, Mountain View, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 13 days.

(21) Appl. No.: 18/397,927

(22) Filed: Dec. 27, 2023

(65) Prior Publication Data

US 2024/0129493 A1 Apr. 18, 2024

Related U.S. Application Data

(63) Continuation-in-part of application No. 17/583,629, filed on Jan. 25, 2022, now Pat. No. 11,863,761,
(Continued)

(51) Int. Cl.
*H04N 19/166* (2014.01)
*G06F 9/54* (2006.01)
(Continued)

(52) U.S. Cl.
CPC .......... *H04N 19/166* (2014.11); *G06F 9/542* (2013.01); *G06T 7/20* (2013.01); *G06V 20/52* (2022.01);
(Continued)

(58) Field of Classification Search
CPC ........ H04N 19/166; H04N 7/12; H04N 7/183; H04N 7/185; H04N 17/002; H04N 19/103; H04N 19/124; H04N 19/156; H04N 19/184; H04N 19/40; H04N 19/42; H04N 23/661; H04N 23/665; H04N 23/6811;
(Continued)

(56) References Cited

U.S. PATENT DOCUMENTS 8,086,252 B2 12/2011 Luers
10,742,998 B2 8/2020 Emmanuel et al.
(Continued)

FOREIGN PATENT DOCUMENTS

CN 1618208 5/2005
CN 101070763 11/2007
(Continued)

OTHER PUBLICATIONS

Qi, Lv, "Research on Measuring and Control Technology for the Intellectualization and Energy Saving in Green Home", China Master's Theses Full-text Database; 1136- 482, 137 pages.
(Continued)

*Primary Examiner* — Usman A Khan
(74) *Attorney, Agent, or Firm* — Perkins Coie LLP

(57) ABSTRACT

Adjusting communication channels used by camera to communicate with a base station are described. In one aspect, characteristics of communication channels can be determined and the operation of the camera can be adjusted to use a communication channel based on a comparison of the characteristics of multiple communication channels.

20 Claims, 13 Drawing Sheets

Related U.S. Application Data which is a continuation of application No. 17/316,120, filed on May 10, 2021, now Pat. No. 11,290,727, which is a continuation of application No. 16/032,235, filed on Jul. 11, 2018, now Pat. No. 11,006,128.

(60) Provisional application No. 62/633,017, filed on Feb. 20, 2018.

(51) Int. Cl.

| | |
|---|---|
| *G06T 7/20* | (2017.01) |
| *G06V 20/52* | (2022.01) |
| *G07C 9/37* | (2020.01) |
| *G08B 3/10* | (2006.01) |
| *G08B 5/22* | (2006.01) |
| *G08B 13/191* | (2006.01) |
| *G08B 13/193* | (2006.01) |
| *G08B 13/196* | (2006.01) |
| *G08B 21/18* | (2006.01) |
| *G08B 27/00* | (2006.01) |
| *G08B 29/18* | (2006.01) |
| *H04B 17/318* | (2015.01) |
| *H04B 17/391* | (2015.01) |
| *H04L 1/00* | (2006.01) |
| *H04L 5/00* | (2006.01) |
| *H04L 43/0852* | (2022.01) |
| *H04L 43/12* | (2022.01) |
| *H04L 43/16* | (2022.01) |
| *H04L 65/612* | (2022.01) |
| *H04L 65/65* | (2022.01) |
| *H04L 65/80* | (2022.01) |
| *H04L 67/1087* | (2022.01) |
| *H04N 7/12* | (2006.01) |
| *H04N 7/18* | (2006.01) |
| *H04N 17/00* | (2006.01) |
| *H04N 19/103* | (2014.01) |
| *H04N 19/124* | (2014.01) |
| *H04N 19/156* | (2014.01) |
| *H04N 19/184* | (2014.01) |
| *H04N 19/40* | (2014.01) |
| *H04N 19/42* | (2014.01) |
| *H04N 23/60* | (2023.01) |
| *H04N 23/661* | (2023.01) |
| *H04N 23/68* | (2023.01) |
| *H04N 23/90* | (2023.01) |
| *H04W 4/38* | (2018.01) |
| *H04W 24/08* | (2009.01) |
| *H04W 24/10* | (2009.01) |
| *H04W 28/02* | (2009.01) |
| *H04W 36/00* | (2009.01) |
| *H04W 36/30* | (2009.01) |
| *H04W 52/02* | (2009.01) |
| *H04W 72/0453* | (2023.01) |
| *H04W 72/23* | (2023.01) |
| *H05B 47/105* | (2020.01) |
| *H05B 47/19* | (2020.01) |
| *H04N 7/14* | (2006.01) |
| *H04N 19/00* | (2014.01) |

(52) U.S. Cl.
CPC ............... *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/19656* (2013.01); *G08B 13/1966* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 5/0098* (2013.01); *H04L 43/0858* (2013.01); *H04L 43/12* (2013.01); *H04L 43/16* (2013.01); *H04L 65/612* (2022.05); *H04L 65/65* (2022.05); *H04L 65/80* (2013.01); *H04L 67/1093* (2013.01); *H04N 7/12* (2013.01); *H04N 7/183* (2013.01); *H04N 7/185* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04N 23/661* (2023.01); *H04N 23/665* (2023.01); *H04N 23/6811* (2023.01); *H04N 23/90* (2023.01); *H04W 4/38* (2018.02); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/0453* (2013.01); *H04W 72/23* (2023.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(58) Field of Classification Search
CPC ........ H04N 23/90; H04N 7/147; H04N 7/181; H04N 19/00; G06F 9/542; G06T 7/20; G06T 2207/30232; G06T 2207/30241; G06T 2207/20081; G06T 2207/20084; G06T 2207/30168; G06T 7/0002; G06V 20/52; G07C 9/37; G08B 3/10; G08B 3/1016; G08B 5/223; G08B 13/191; G08B 13/193; G08B 13/19656; G08B 13/1966; G08B 13/19669; G08B 13/19695; G08B 21/182; G08B 27/006; G08B 29/183; G08B 13/19665; H04B 17/318; H04B 17/391; H04L 1/0003; H04L 1/0009; H04L 1/0017; H04L 1/0033; H04L 5/0053; H04L 5/0098; H04L 43/0858; H04L 43/12; H04L 43/16; H04L 65/612; H04L 65/65; H04L 65/80; H04L 67/1093; H04L 1/0014; H04L 41/5025; H04W 4/38; H04W 24/08; H04W 24/10; H04W 28/021; H04W 36/0011; H04W 36/30; H04W 52/0245; H04W 52/0261; H04W 72/0453; H04W 72/23; H04W 36/00837; H04W 36/304; H05B 47/105; H05B 47/19; G06N 3/045; G06N 3/08; G06N 20/00
USPC .................................................... 348/222.1
See application file for complete search history.

(56) References Cited

U.S. PATENT DOCUMENTS

| | | |
|---|---|---|
| 10,805,613 B2 | 10/2020 | Emmanuel et al. |
| 10,855,996 B2 | 12/2020 | Amini et al. |
| 11,006,128 B2 | 5/2021 | Emmanuel et al. |
| 11,064,208 B2 | 7/2021 | Amini et al. |
| 11,102,492 B2 | 8/2021 | Amini et al. |
| 11,272,189 B2 | 3/2022 | Emmanuel et al. |

(56) References Cited

U.S. PATENT DOCUMENTS

| | | |
|---|---|---|
| 11,290,727 B2 | 3/2022 | Emmanuel et al. |
| 11,558,626 B2 | 1/2023 | Amini et al. |
| 11,575,912 B2 | 2/2023 | Amini et al. |
| 11,671,606 B2 | 6/2023 | Amini et al. |
| 11,756,390 B2 | 9/2023 | Amini et al. |
| 11,863,761 B2 | 1/2024 | Emmanuel et al. |
| 12,177,454 B2 | 12/2024 | Amini et al. |
| 12,293,583 B2 | 5/2025 | Amini et al. |
| 2005/0021724 A1 | 1/2005 | Kung et al. |
| 2006/0094369 A1 | 5/2006 | Nguyen |
| 2006/0179463 A1 | 8/2006 | Chisholm et al. |
| 2009/0143078 A1 | 6/2009 | Tu et al. |
| 2010/0081447 A1 | 4/2010 | Qi et al. |
| 2010/0214943 A1 | 8/2010 | Immendorf et al. |
| 2011/0128389 A1 | 6/2011 | Maeda et al. |
| 2011/0222449 A1 | 9/2011 | Goldberg et al. |
| 2012/0185429 A1 | 7/2012 | Shu et al. |
| 2012/0287879 A1 | 11/2012 | Nentwig |
| 2013/0107816 A1 | 5/2013 | Iraji et al. |
| 2013/0120597 A1 | 5/2013 | Sakai et al. |
| 2013/0322329 A1 | 12/2013 | Visuri et al. |
| 2013/0331097 A1 | 12/2013 | Kang et al. |
| 2014/0044113 A1 | 2/2014 | Chu |
| 2015/0029333 A1 | 1/2015 | Ko et al. |
| 2015/0154786 A1 | 6/2015 | Furukawa et al. |
| 2015/0172958 A1 | 6/2015 | Allanki et al. |
| 2015/0195187 A1 | 7/2015 | Savolainen |
| 2015/0195324 A1 | 7/2015 | Kim |
| 2015/0205749 A1 | 7/2015 | Whitby-Strevens et al. |
| 2015/0263963 A1* | 9/2015 | Minakuchi ............... H04L 47/34 370/392 |
| 2015/0333965 A1 | 11/2015 | Lee et al. |
| 2016/0014679 A1 | 1/2016 | Taneja |
| 2016/0050396 A1 | 2/2016 | Gali et al. |
| 2016/0105644 A1 | 4/2016 | Smith et al. |
| 2016/0105847 A1 | 4/2016 | Smith et al. |
| 2016/0134932 A1 | 5/2016 | Karp et al. |
| 2016/0286500 A1 | 9/2016 | Zur et al. |
| 2016/0295172 A1 | 10/2016 | Cuddeback et al. |
| 2017/0142728 A1 | 5/2017 | Tsai et al. |
| 2017/0163513 A1 | 6/2017 | Kim et al. |
| 2017/0163944 A1 | 6/2017 | Jeong |
| 2017/0178475 A1 | 6/2017 | Renkis |
| 2017/0257261 A1 | 9/2017 | Monnerat |
| 2017/0278368 A1 | 9/2017 | Burke |
| 2017/0303138 A1 | 10/2017 | Barmettler et al. |
| 2017/0318524 A1 | 11/2017 | Goto |
| 2017/0374567 A1 | 12/2017 | Takahashi et al. |
| 2018/0109999 A1 | 4/2018 | Finnegan |
| 2019/0045407 A1 | 2/2019 | Logan et al. |
| 2019/0174383 A1 | 6/2019 | Zhang et al. |
| 2019/0259260 A1 | 8/2019 | Amini et al. |
| 2019/0261243 A1 | 8/2019 | Amini et al. |
| 2019/0372918 A1* | 12/2019 | Genç ..................... H04L 51/10 |
| 2020/0145890 A1 | 5/2020 | Ma et al. |
| 2020/0186227 A1 | 6/2020 | Reider et al. |
| 2023/0262234 A1 | 8/2023 | Amini et al. |
| 2024/0406415 A1 | 12/2024 | Amini et al. |
| 2025/0182481 A1 | 6/2025 | Amini et al. |

FOREIGN PATENT DOCUMENTS

| | | |
|---|---|---|
| CN | 101547342 | 9/2009 |
| CN | 102523435 | 6/2012 |
| CN | 102547247 | 7/2012 |
| CN | 102811370 | 12/2012 |
| CN | 103369318 | 10/2013 |
| CN | 103582168 | 2/2014 |
| CN | 103945438 | 7/2014 |
| CN | 104919788 | 9/2015 |
| CN | 205028060 | 2/2016 |
| CN | 105636078 | 6/2016 |
| CN | 105792295 | 7/2016 |
| CN | 105898471 | 8/2016 |
| CN | 110177071 | 8/2019 |
| CN | 110177398 | 8/2019 |
| CN | 110191309 | 8/2019 |

OTHER PUBLICATIONS

Yang, Chaofan, et al., "Enhancing Industrial Video Surveillance over Wireless Mesh", 2016 25th International Conference on Computer Communication and Networks, 44 pages.

* cited by examiner

CAMERA COMMUNICATION CHANNEL SELECTION

CLAIM FOR PRIORITY

This application is a continuation-in-part of U.S. patent application Ser. No. 17/583,629 entitled "Camera Communication Channel Selection," and filed on Jan. 25, 2022, which is continuation application of U.S. patent application Ser. No. 17/316,120 entitled "Camera Communication Channel Selection," and filed on May 10, 2021 (now U.S. Pat. No. 11,290,727), which is a continuation application of U.S. patent application Ser. No. 16/032,235, entitled "Camera Communication Channel Selection," and filed on Jul. 11, 2018 (now U.S. Pat. No. 11,006,128), which claims priority to U.S. Provisional Patent Application No. 62/633,017, entitled "Optimization and Testing of Wireless Devices," and filed on Feb. 20, 2018, of which all are incorporated herein by reference in their entireties.

TECHNICAL FIELD

The disclosure relates to cameras, and in particular adjusting camera operation to use different communication channels.

BACKGROUND

Cameras for home or business security uses can generate video data depicting activity occurring within a field of vision of an image sensor of the camera. Often, the video data is transmitted wirelessly to a base station over a communication channel, for example, one implemented using one of the Institute of Electrical and Electronics Engineers (IEEE) 802.11 wireless local area network (LAN) standards.

Many cameras include the capabilities to use different types of communication channels. However, the characteristics of the communication channels can change over time, resulting in a degradation of the ability of the camera to provide the video data to the base station using a selected communication channel. For example, if the camera is using a communication channel that is being used by too many devices, then the throughput of the communication channel might not be ideal for the transfer of the video data to the base station. This can degrade the quality of the video data and degrade the user experience.

SUMMARY

Some of the subject matter described herein includes a method comprising: determining, by a processor, characteristics of a first communication channel and characteristics of a second communication channel usable by a first camera; determining, by the processor, the second communication channel provides better video data transfer capabilities from the first camera than the first communication channel based on a comparison of the characteristics of the first communication channel and the characteristics of the second communication channel; and adjusting, by the processor, operation of the first camera to switch from using the first communication channel to the second communication channel to provide a first video data depicting activity occurring within a field of vision of the first camera, the adjusting based on the comparison of the characteristics of the first communication channel and the characteristics of the second communication channel.

In some implementations, the comparison of the characteristics of the first communication channel and the characteristics of the second communication channel includes determining that the second communication channel has a higher bit rate than the first communication channel.

In some implementations, the first communication channel has a first frequency band, and the second communication channel has a second frequency band, the first frequency band and the second frequency band including different frequencies.

In some implementations, the second frequency includes higher frequencies than the first frequency band.

In some implementations, adjusting the operation of the first camera includes adjusting an encoding of the first video data from a first encoding type to a second encoding type, the first encoding type and the second encoding type producing the first video data at different bit rates.

In some implementations, the second encoding type encodes the video at a higher bit rate than the first encoding type.

In some implementations, the method includes determining that a second camera has begun providing a second video data using the first communication channel while the first camera is also providing the first video data using the second communication channel; and adjusting operation of the second camera to use the second communication channel, and adjusting operation of the first camera to use the first communication channel based upon the determination that the second camera has begun providing the second video data.

Some of the subject matter described herein also includes an electronic device, comprising: one or more processors; and memory storing instructions, wherein the processor is configured to execute the instructions such that the processor and memory are configured to: determine characteristics of a first communication channel and characteristics of a second communication channel usable by a first camera; determine the second communication channel provides better video data transfer capabilities from the first camera than the first communication channel based on a comparison of the characteristics of the first communication channel and the characteristics of the second communication channel; and adjust operation of the first camera to switch from using the first communication channel to the second communication channel to provide a first video data depicting activity occurring within a field of vision of the first camera, the adjusting based on the comparison of the characteristics of the first communication channel and the characteristics of the second communication channel.

In some implementations, the comparison of the characteristics of the first communication channel and the characteristics of the second communication channel includes determining that the second communication channel has a higher bit rate than the first communication channel.

In some implementations, the first communication channel has a first frequency band, and the second communication channel has a second frequency band, the first frequency band and the second frequency band including different frequencies.

In some implementations, the second frequency includes higher frequencies than the first frequency band.

In some implementations, adjusting the operation of the first camera includes adjusting an encoding of the first video data from a first encoding type to a second encoding type, the first encoding type and the second encoding type producing the first video data at different bit rates.

In some implementations, the second encoding type encodes the video at a higher bit rate than the first encoding type.

In some implementations, the processor is configured to execute the instructions such that the processor and memory are configured to: determine that a second camera has begun providing a second video data using the first communication channel while the first camera is also providing the first video data using the second communication channel; and adjust operation of the second camera to use the second communication channel, and adjusting operation of the first camera to use the first communication channel based upon the determination that the second camera has begun providing the second video data.

Some of the subject matter described herein also includes a computer program product including one or more non-transitory computer-readable media storing computer program instructions, execution of which by a processing system causes the processing system to perform operations comprising: determine characteristics of a first communication channel and characteristics of a second communication channel usable by a first camera; determine the second communication channel provides better video data transfer capabilities from the first camera than the first communication channel based on a comparison of the characteristics of the first communication channel and the characteristics of the second communication channel; and adjust operation of the first camera to switch from using the first communication channel to the second communication channel to provide a first video data depicting activity occurring within a field of vision of the first camera, the adjusting based on the comparison of the characteristics of the first communication channel and the characteristics of the second communication channel.

In some implementations, the comparison of the characteristics of the first communication channel and the characteristics of the second communication channel includes determining that the second communication channel has a higher bit rate than the first communication channel.

In some implementations, the first communication channel has a first frequency band, and the second communication channel has a second frequency band, the first frequency band and the second frequency band including different frequencies.

In some implementations, the second frequency includes higher frequencies than the first frequency band.

In some implementations, adjusting the operation of the first camera includes adjusting an encoding of the first video data from a first encoding type to a second encoding type, the first encoding type and the second encoding type producing the first video data at different bit rates.

In some implementations, the processor is configured to execute the instructions such that the processor and memory are configured to: determine that a second camera has begun providing a second video data using the first communication channel while the first camera is also providing the first video data using the second communication channel; and adjust operation of the second camera to use the second communication channel, and adjusting operation of the first camera to use the first communication channel based upon the determination that the second camera has begun providing the second video data.

DETAILED DESCRIPTION

Figure 1:
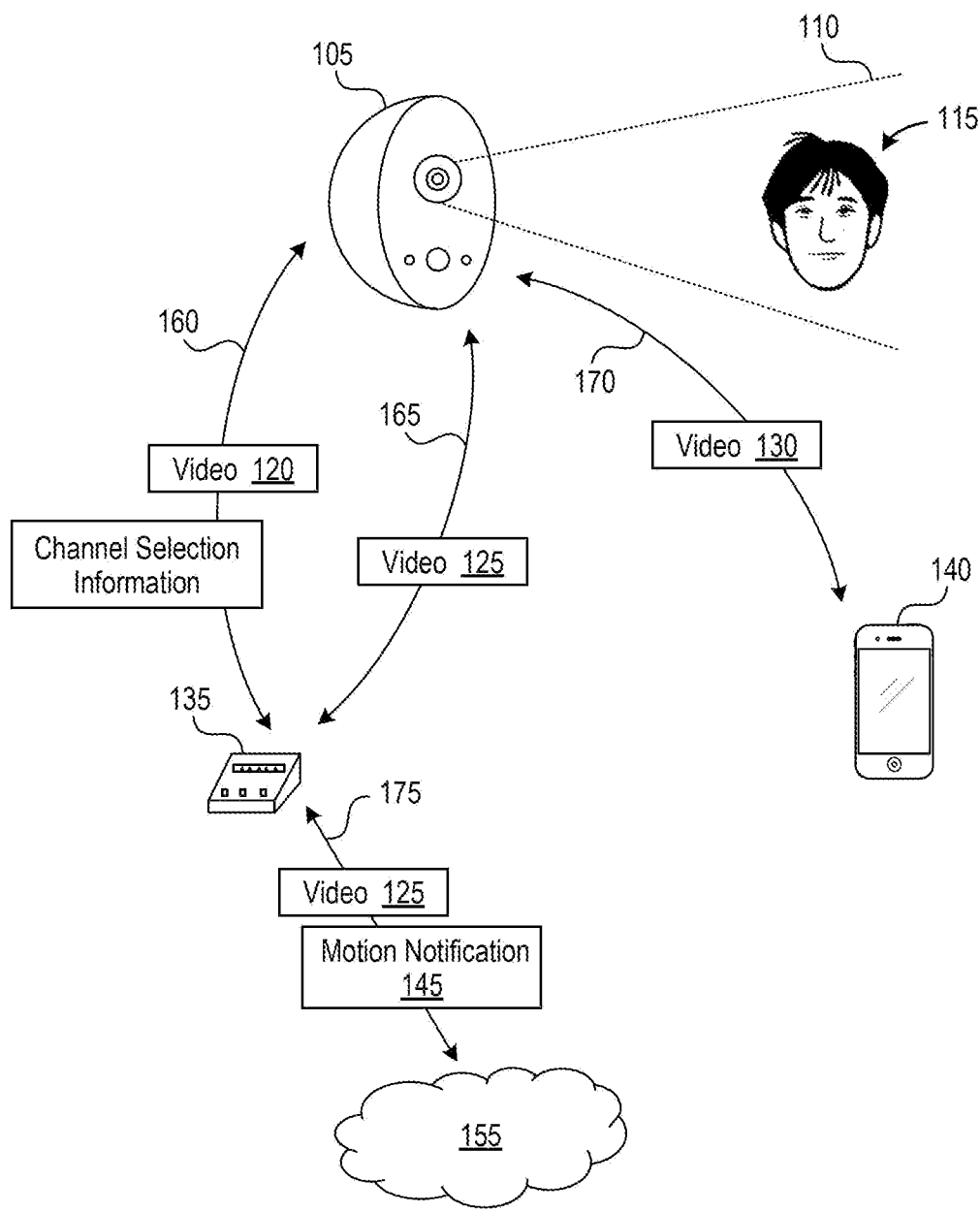
FIG. 1 illustrates an example of adjusting a communication channel used by a camera, in accordance with one or more embodiments of this disclosure.

This disclosure describes techniques for switching a communication channel used by a camera to provide video data to a base station. In one example, a camera can use one or more of different types of communication channels to wirelessly transmit, or stream, video data to a base station upon detection of motion within a field of view of an image sensor of the camera. The camera can have the capability to transmit the video data using, for example, a communication channel implementing using the Institute of Electrical and Electronics Engineers (IEEE) 802.11 wireless local area network (WLAN) standards in a 2.4 gigahertz (GHz) frequency band, another communication channel implementing the IEEE 802.11 WLAN standards in the 5 GHz frequency band, another communication channel implemented via a cellular communication technology standard such as Long-Term Evolution (LTE), another communication channel implemented via Digital Enhanced Cordless Telecommunications (DECT), another communication channel implemented by a wireless personal area network (PAN) such as Bluetooth, Z-Wave, Zigbee, another communication channel implemented via millimeter wave (mmWave), or other types of wireless communications technologies.

However, the communication channel used by the camera might degrade over time. For example, the communication channel might experience interference that reduces its throughput (and, therefore, reduces the available bit rate for the communication channel). This can result in the camera compressing the video quality of the video data so that it is at a lower bit rate and, therefore, the corresponding video would not look as pleasing (e.g., have less visual detail, resolution, etc.) to a user than if the video had a higher bit rate. Other devices within the environment (e.g., other cameras) might also be using the same communication channel which can also cause the communication channel to be congested and, therefore, a lower bit rate is available for the devices. This can also result in the quality of the video data provided by the camera to the base station to be reduced such that the video data can be provided to the base station within some threshold latency.

As described herein, the base station can instruct the camera to change the communication channel it is using to provide better video data transfer capabilities. For example, the base station can receive video data from the camera using the IEEE 802.11 standard in the 2.4 GHz band. The base station can then determine that the IEEE 802.11 standard in the 5 GHz band provides a higher quality communication channel for the video data transfer, for example, by comparing the available bit rate of the communication channels. If the 5 GHz band provides a higher bit rate such that the quality (e.g., bit rate of the encoding) of the video data can be increased to provide the user with a better video to watch, then the base station can instruct the camera to switch to the 5 GHz band from the 2.4 GHz band and provide the video data on the 5 GHz band. Additionally, the base station can instruct the camera to adjust how it is encoding the video, for example, by increasing the encoding to a higher bit rate or switching to a different video compression standard to take advantage of the better communication channel.

In more detail, FIG. 1 illustrates an example of adjusting a communication channel used by a camera. In FIG. 1, camera 105 includes an infrared (IR) sensor that can be used to detect motion by determining the motion of heat in the infrared portion of the electromagnetic spectrum. Upon detection of motion, camera 105 can then use an image sensor (e.g., complementary metal-oxide-semiconductor (CMOS) image sensor) to generate video data depicting the activity creating the detected motion within its field of vision 110 and within the visible light portion of the electromagnetic spectrum. In FIG. 1, this can be a video visually depicting intruder 115 entering field of vision 110.

In FIG. 1, camera 105 can then provide video 120 to base station 135 using communication channel 160. Video 120 can be provided in a variety of ways including streaming fragments of video data as the video fragments are generated by camera 105 or uploading an entire video file after the last fragment has been generated rather than streaming fragments or groups of fragments as they are generated. Base station 135 can be an electronic device in wireless communication with camera 105 and cloud server 155 to receive video data from camera 105 and provide that video or a notification of recorded video to cloud server 155 such that a homeowner (e.g., the owner of the home in which camera 105 is installed upon or within) can be alerted to intruder 115. Though many of the examples described herein relate to wireless communications, the devices described herein can also be physically wired to each to provide the transfer of the various types of data being generated.

However, the characteristics of communication channel 160 might change over time. For example, network congestion can increase as other devices use the same communication channel to communicate with base station 135 or even other devices within the environment. An increase in network congestion can result in a reduced quality of service because the communication channel might need to transfer more data than it can handle. Other issues, such as interference, can also reduce the throughput of communication channel 160, resulting in a reduced bit rate for the transfer of video 120. If the bit rate available for transfer of video 120 using communication channel 160 is too low, then the bit rate of the encoding of the video might need to be reduced such that video 120 can be provided to base station 135 within a reasonable time.

In FIG. 1, base station 135 and camera 105 can include multiple radios and/or antennas to communicate in other communication channels. By having the capability to use multiple communication channels, another communication channel can be used if the currently used communication channel does not offer the right characteristics. For example, camera 105 can also communicate with base station 135 via communication channel 165. Communication channels 160 and 165 can be implemented via any number of technologies including IEEE 802.11 WLAN standards in the 2.4 GHz frequency band, the IEEE 802.11 WLAN standard in the 5 GHz frequency band, cellular communication technology such as Long-Term Evolution (LTE), Digital Enhanced Cordless Telecommunications (DECT), or a wireless personal area network (PAN) such as Bluetooth, Z-Wave, Zigbee, etc. For example, communication channel 160 can be implemented via IEEE 802.11 WLAN in the 2.4 GHz frequency band, and communication channel 165 can be implemented via IEEE 802.11 WLAN in the 5 GHz frequency band. The IEEE 802.11 WLAN in the 5 GHz frequency band includes higher frequencies than the IEEE 802.11 WLAN in the 2.4 GHz frequency band. For example, the frequencies for the 2.4 GHz band might range from 2.4 GHz to 2.5 GHz. The frequencies for the 5 GHz band might range from 5.15 GHz to 5.30 GHz. Thus, the 5 GHz band includes higher frequencies than the 2.4 GHz band, resulting in the 5 GHz band potentially having a higher bit rate. Though the 2.4 GHz band might operate at a lower frequency, the 2.4 GHz might have better range and penetration through solid objects such as walls. Therefore, based on the placement of the camera 105 and base station 135, different communication channels might be better to use. Additionally, the communication channels might be used differently at different times during the day, resulting in different characteristics for the communication channels throughout the day. For example, in the evenings, the 5 GHz communication channel might be used by more devices as more people are home using devices.

Base station 135 can determine that camera 105 should switch from using communication channel 160 to using communication channel 165 if communication channel 165 provides better capabilities for wirelessly transferring video. For example, base station 135 can determine that communication channel 165 currently has a higher bit rate than communication channel 160 by comparing the bit rates that the communication channels are operating at. Base station 135 can then generate channel selection information providing instructions or information to camera 105 on communication channel 160 such that camera 105 can then switch to providing video 125 upon communication channel 165 instead of communication channel 160. Video 125 can include video data depicting activities within field of vision 110 occurring after video 120 was provided to base station 135. That is, video 125 can be the second portion of a video occurring after video 120 is provided to base station 135 and camera 105 switches over to using communication channel 165.

Base station 135 can provide video 125 (and video 120) to cloud server 155 such that the homeowner can view the video depicting intruder 115 later. Additionally, motion notification 145 can be generated upon base station 135 receiving video 120 so that the homeowner can receive an alert of the notification. For example, upon receiving motion notification 145, cloud server 155 can generate a text message that is transmitted to the homeowner's smartphone, send an email to the homeowner's email address, or cause a notification via an app to show on the homeowner's smartphone.

Additionally, base station 135 can determine whether internet connection 175 (i.e., a communication channel used by base station 135 to communicate with cloud server 155) is functioning or degraded. For example, if internet connection 175 is down (i.e., data cannot be exchanged between base station 135 and cloud server 155) or if the throughput of internet connection 175 is low (e.g., having a lower than expected bit rate for sending video 125 to cloud server 155) such that video 125 or video 120 would be provided to cloud server 155 too slowly, then base station 135 can determine this (e.g., by attempting to send a packet of data to cloud server 155 and checking to see if an acknowledgement packet is received back) and then generate channel selection information so that camera 105 can select a different communication channel that does not rely on base station 135 to provide video data to cloud server 155. For example, communication channel 170 can be implemented via LTE such that video 130 can be provided via a cellular connection to smartphone 140. Thus, base station 135 can determine a variety of characteristics of the communication channels and adjust which communication channel that camera 105 uses to provide video data depicting intruder 115 within field of vision 110. In addition to adjusting the communication channels, base station 135 can also instruct camera 105 to change how camera 105 is generating the video data, for example, by changing the type of compression used for the encoding of the video or the bit rate of the encoding.

By adjusting the communication channel used by camera 105, a better user experience can be provided. For example, the videos can be provided faster to base station 135, smartphone 140, or cloud server 155. Additionally, the quality of the videos can be improved, for example, by recording the video data with a compression standard and/or bit rate based on the communication channel being used. This can also provide a better user experience.

Figure 2:
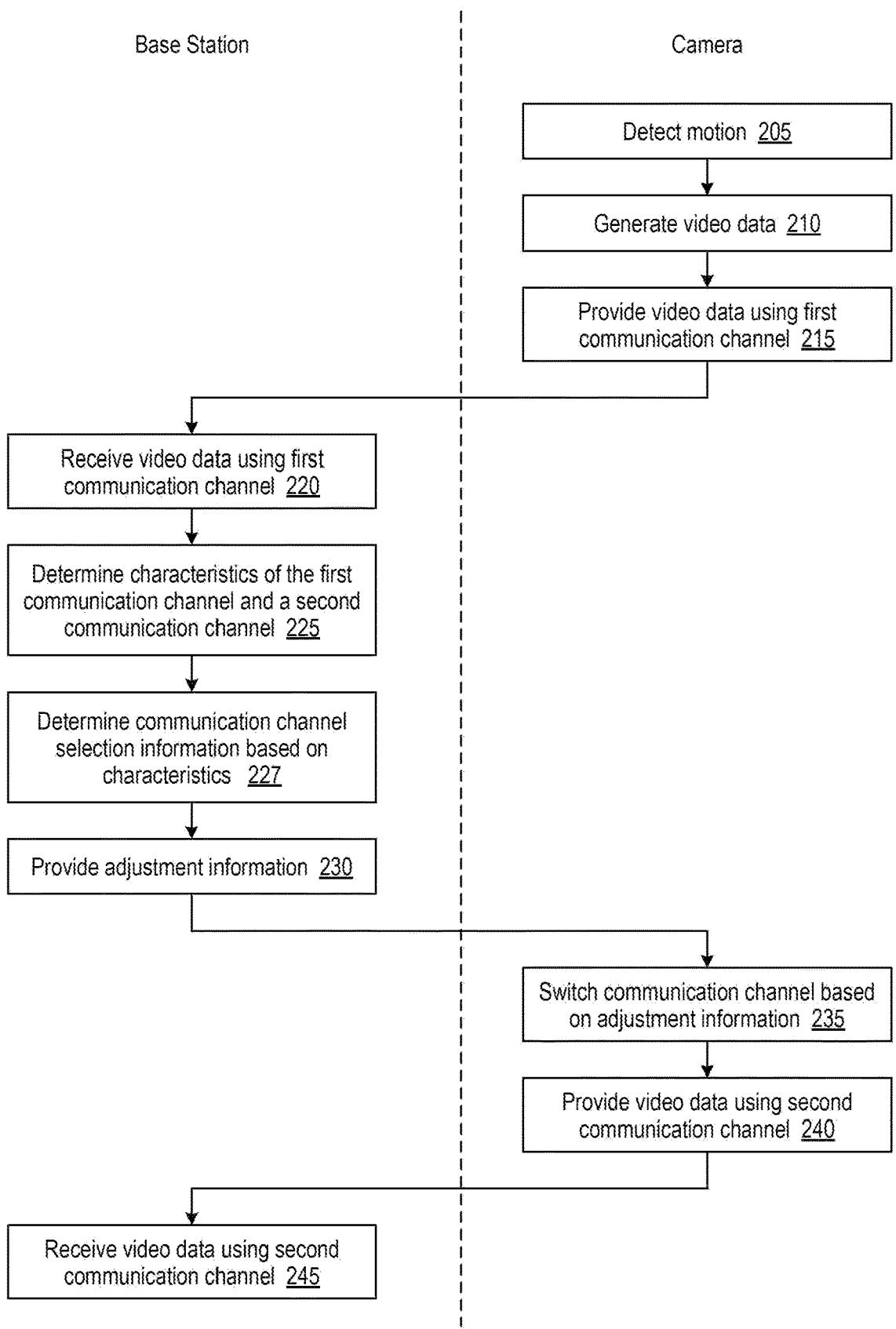
FIG. 2 illustrates an example of a block diagram for adjusting operation of a camera to use a different communication channel, in accordance with one or more embodiments of this disclosure.

FIG. 2 illustrates an example of a block diagram for adjusting operation of a camera to use a different communication channel. In FIG. 2, a camera can detection motion (205) and generate video data (210) upon detection of that motion. For example, in FIG. 1, camera 105 can detect the movement of intruder 115 within field of vision 110 and then generate video 120. Video data can then be provided to a base station using a first communication channel (215). For example, in FIG. 1, video 120 can be wirelessly transmitted to base station 135 using communication channel 160.

The base station can receive the video data using the first communication channel (220). The base station can also determine characteristics of the first communication channel and a second communication channel (225). For example, in FIG. 1, base station 135 can determine characteristics of communication channel 160 (i.e., the communication channel used by camera 105 to provide video 120 to base station 135) and communication channel 165, which is another communication channel available for use for wireless communication between camera 105 and base station 135. Base station 135 can determine a variety of characteristics of communication channels 160 and 165, for example, interference on the communication channels, the throughput of the communication channels, the available bit rate of the communication channels, how many devices are using the communication channels, etc.

The base station can then determine communication channel selection information based on the characteristics (227). For example, in FIG. 1, base station 135 can analyze the characteristics of communication channels 160 and 165, for example, by comparing the characteristics to determine the differences between the channels. The communication channel with the better characteristics for providing the video data from camera 105 to base station 135 can then be selected for use. For example, communication channel 165 can be selected for camera 105 to use if communication channel 165 has characteristics that would provide a better mechanism to provide video data from camera 105 to base station 135 than communication channel 160, for example, higher throughput, higher available bit rate for camera 105, less interference, etc. The base station can then provide adjustment information to the camera (230). The adjustment information can include data or instructions for the camera to switch from using communication channel 160 to providing the video data using communication channel 165.

The camera can then switch from using the first communication channel to the second communication channel based on the adjustment information (235). This can result in the camera providing the video data using the second communication channel (240). For example, in FIG. 1, camera 105 can switch from using communication channel 160 to using communication channel 165 and providing video 125 on communication channel 165. The base station can then receive the video data using the second communication channel (245).

Often, a home or business might have multiple cameras set up. These multiple cameras might be providing video data to base station 135 at the same or similar times. If the multiple cameras use the same communication channel, then this might degrade the performance or quality of service, as described above. In some implementations, base station 135 can determine whether multiple cameras are providing video data and adjust how those multiple cameras are providing video data to provide better performance or service.

In some implementations, the communication channel selected (or switched to) can be based on coexistence issues with other communication protocols or standards. For example, if LTE band 40 is being used at 2300 MHz to 2400 MHz for Internet access, then the channel selected for camera 105 can be selected such that it is farther away from the LTE band 40 frequency range in the frequency domain. Thus, in this example, if the communication channel is being switched from the IEEE 802.11 5 GHz standard to the IEEE 802.11 2.4 GHz standard, then a channel within the 2.4 GHz that does not overlap within the 2300 MHz to 2400 MHz frequency band can be selected.

Additionally, characteristics regarding the performance of the camera 105, base station 135, or the system including both camera 105 and base station 135 can be considered. For example, some channels might result in camera 105 to use more power to transmit data including video, resulting in a higher transmit power and, therefore, better transmission capabilities for providing video to base station 135. In this situation, those communication channels that use higher power can be selected. For example, in North American, channels 1 and 11 in the IEEE 802.11 standards are designated for low power communications and, therefore, those channels can be avoided for channels that can be used with high power.

In some implementations, noise or interference in some communication channels can be experienced due to harmonics (e.g., from processors, memory, and other hardware within camera 105). The noise and interference can change as the devices are being used. Thus, the amount of noise or interference can be considered, and the selection of the communication channel can be based on the amount of noise or interference.

Additionally, some cameras can be designated as having a higher priority than another camera. For example, a camera providing a field of view of the pathway to a front door of a house might be more important than a camera that has a field of view of a driveway or backyard rather than the front door of the house. In this case, the camera with that has a higher priority can have a communication channel preference being weighted higher than the other camera. The priorities can be designated by a user (e.g., via a smartphone app, website, etc.) or the priorities can be designated by base station 135. For example, base station 135 can determine that one camera has a field of view of the front of a door and that another camera does not have a field of view of the front of the door by analyzing the image content generated by the videos.

Figure 3:
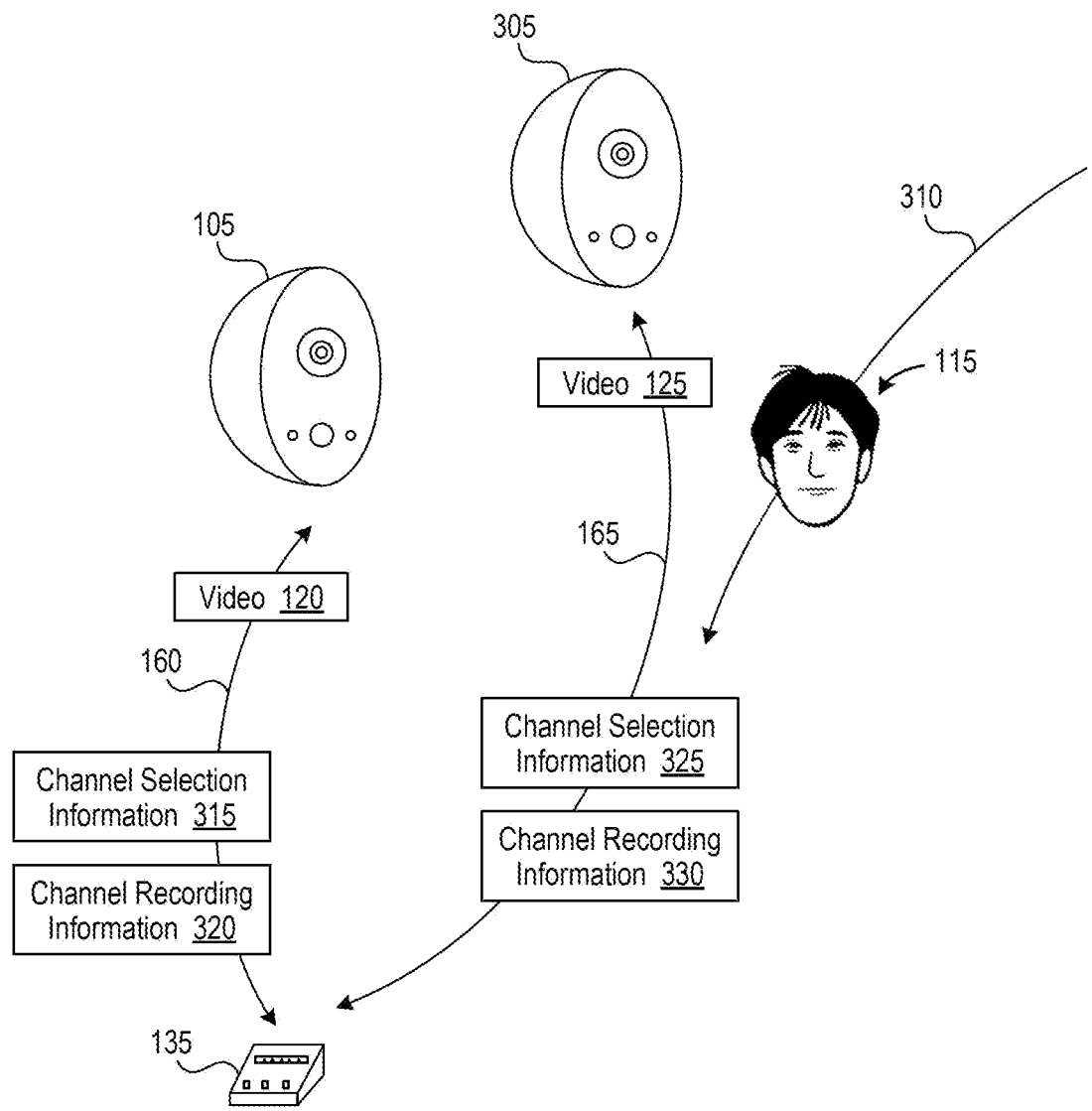
FIG. 3 illustrates an example of adjusting communication channels used by multiple cameras, in accordance with one or more embodiments of this disclosure.

FIG. 3 illustrates an example of adjusting communication channels used by multiple cameras. In FIG. 3, base station 135 can adjust how both camera 105 and camera 305 provide video data to base station 135 via communication channels. For example, in FIG. 3, camera 105 can be using communication channel 160 to communicate with base station 135 and camera 305 can be using communication channel 165 to communicate with base station 135. Cameras 105 and 305 can be placed within different locations and, therefore, have different fields of view. Moreover, even if the cameras use the same communication channel, the performance might be different due to how the different physical locations affect the communication channel.

In FIG. 3, as intruder 115 moves along path 310, intruder 115 would first appear within the field of vision of camera 305. This results in video 125 being generated and provided to base station 135 via communication channel 165, which might be implemented via the IEEE 802.11 standards in the 5 GHz band. Later, as intruder 115 continues along path 310, eventually the user might also appear within the field of vision of camera 105. This would result in video 120 being generated by camera 105 and provided to base station 135. Moreover, the field of visions of both cameras 105 and 305 might overlap, resulting in both cameras 105 and 305 generating and wirelessly transmitting videos 120 and 125, respectively, at the same time.

Base station 135 can adjust which communication channel is being used by the cameras as videos are provided. For example, if video 125 is first provided by camera 305 but intruder 115 is not yet within the field of vision of camera 105, then only communication channel 165 can be used to provide video data providing a visual depiction of intruder 115. Communication channel 165 might be selected if it is the best communication channel to provide video 125 to base station 135, for example, it has a high bit rate such as a 5 GHz band. Eventually, when intruder 115 is within the field of vision of camera 105, then video 120 can be generated by camera 105 even while intruder 115 is within the field of vision of camera 305 and video 125 is still being provided to base station 135. In some implementations, communication channel 165 can also be used by camera 105 to provide video 120 to base station 135. That is, both cameras 105 and 305 can use the same communication channel to provide video data. However, in some implementations, the cameras might provide a better experience if different communication channels are used to provide video data to base station 135. For example, camera 105 might initially use communication channel 160, which can be a 2.4 GHz band. This can result in a situation where camera 305 is using communication channel 165 that allows a higher bit rate and, therefore, a higher bit rate encoding can be performed of video 125 to provide a higher quality video for the user to watch. By contrast, camera 105 can be using communication channel 160 that allows for a lower bit rate than communication channel 165 and, therefore, a lower bit rate encoding can be performed of video 120 to provide a lower quality video than video 125.

As intruder 115 moves along path 310, video 125 provided by camera 305 might initially provide a better depiction of this movement and, therefore, can benefit from being able to provide a higher quality video. However, as intruder 115 continues along path 310, camera 105 can then provide a video and, eventually, video 120 produced by camera 105 might provide a better view of intruder 115 for a user. In this situation, base station 135 can adjust the communication channels used by the cameras such that the camera that is providing the better view of intruder 115 can be using communication channel 165 (i.e., the communication channel that allows for a higher bit rate for transferring video data in the example). This can result in an improved user experience because the relevant portions of the videos can be higher quality than the less relevant portions of the videos. Moreover, this can provide a more efficient use of the bandwidth of the communication channels.

For example, in FIG. 3, base station 135 can provide channel selection information 315 on communication channel 160 to camera 105 such that it can adjust its operating parameters to switch communication with base station 135 using communication channel 165. Likewise, base station 135 can provide channel selection information 325 to camera 305 such that camera 105 can adjust its operating parameters to switch to using communication channel 165 to provide video 125. This results in the communication channels used by cameras 105 and 305 to switch.

Base station 135 can switch the use of communication channel 165 from camera 305 to camera 105 based on a variety of characteristics. For example, how long a camera is generating video data can be used to switch the use of communication channel 165. For example, if camera 305 is recording video 125 for three minutes and then camera 105 is recording video 120, the use of communication channel 165 can switch from camera 305 to camera 105 after three minutes.

In some scenarios, cameras 105 and 305 can be battery-powered and the use of a communication channel might be more computationally intensive, resulting in the battery draining faster than if another communication channel is being used. For example, using LTE might be more intensive than using one of the IEEE 802.11 WLAN standards. In some implementations, base station 135 can adjust the operations of cameras 105 and 305 such that the camera with lower battery resources (i.e., the camera that might have a lower time to remain operational and record videos using its battery) can use a communication channel that would use less computationally intensive resources to preserve or extend the battery life. For example, in FIG. 1, base station 135 can determine that camera 105 has a lower battery life or less battery capacity or capability to power camera 105 remaining than camera 305. This can result in base station 135 adjusting camera 105 to use communication channel 165 rather than communication channel 160, and camera 305 to use communication channel 160.

Base station 135 can also adjust the communication channel used based on how close the movement being depicted in the video is to the center of the field of vision of the cameras. For example, if camera 305 first begins recording, camera 305 can be selected by base station 135 to use communication channel 165 (e.g., a 5 GHz band) and camera 105 can use communication channel 160 (e.g., a 2.4 GHz band). Eventually, both cameras 105 and 305 can be recording at the same time as intruder 115 travels along path 310 and enters the field of visions of both cameras 105 and 305. Base station 135 can analyze videos 120 and 125 as they are received from cameras 105 and 305, respectively, and if the movement of intruder 115 is eventually closer to the middle of the field of vision of camera 105 than the middle of the field of vision of camera 305, then base station 135 can generate and provide channel selection information 315 and 325 to be provided to camera 105 and 305, respectively, to switch the communication channels being used. Thus, the videos that are generated by the cameras can have higher quality portions of the playback that a user would want to watch to see the activity that occurred (i.e., intruder 115 along path 310).

As depicted in FIG. 3, camera recording information 320 and 330 can also be provided to camera 105 and 305, respectively. Camera recording information 320 and 330 can include information used by the cameras to adjust operation including how the videos are encoded. For example, if base station 135 provides channel selection information 315 to camera 105 to switch to using communication channel 165, base station 135 can also provide camera recording information 320 including the bit rate for encoding video 120 when switching over to communication channel 165. This can allow for base station 135 to determine the bit rate that is available to camera 105 to wirelessly transfer video 120 upon communication channel 165 and then have camera 105 encode video 120 at a bit rate in accordance with the available bit rate of communication channel 165. This can allow for video 120 to be provided to base station 135 in a timely manner and without quality issues such as dropped packets of video data. Base station 135 can also provide camera recording information 320 providing information regarding an encoding type to use. For example, base station 135 can determine that the throughput or available bit rate of communication channel 165 can allow for camera 105 to encode videos using a different encoding standard, such as the High Efficiency Video Coding (HEVC) standard, or H.265, rather than an older standard such as H.264.

Figure 4:
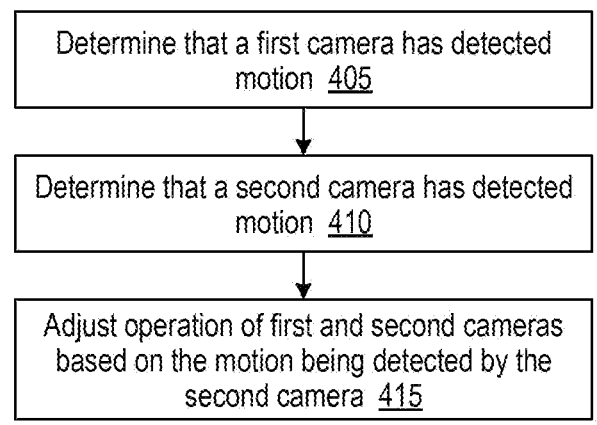
FIG. 4 illustrates an example of a block diagram for adjusting communication channels used by multiple cameras, in accordance with one or more embodiments of this disclosure.

FIG. 4 illustrates an example of a block diagram for adjusting communication channels used by multiple cameras. In FIG. 4, at block 405, a base station can determine that a first camera has detected motion. For example, in FIG. 3, camera 305 can detect motion and provide video 125 depicting that motion to base station 135. Thus, when base station 135 receives video 125, this is an indication that motion has been detected within the field of vison of the image sensor of camera 305. Next, at block 410, it can be determined that a second camera has detected motion. For example, in FIG. 3, camera 105 can detect motion and provide video 120 depicting an object causing the motion to base station 135. Thus, when base station 135 receives video 120, this is also an indication that motion has been detected within the field of vision of the image sensor of camera 105. Next, at block 415, the base station can adjust the operation of the first and second cameras based on the motion being detected by the second camera. For example, in FIG. 3, the communication channels used by cameras 105 and 305 can be switched, as described above.

Figure 5:
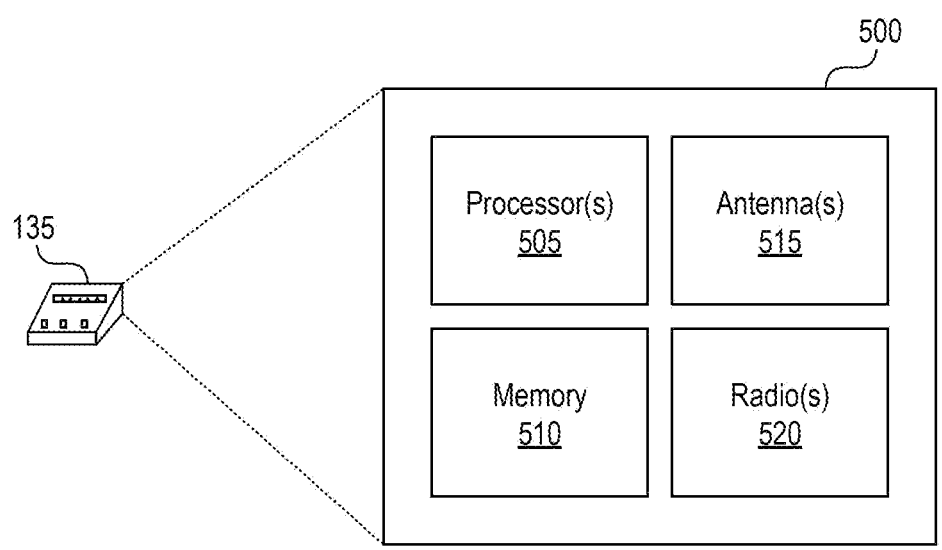
FIG. 5 illustrates an example of a simplified block diagram of an electronic device which may be used with some implementations, in accordance with one or more embodiments of this disclosure.

FIG. 5 illustrates an example of a simplified block diagram of an electronic device which may be used with some implementations. The electronic device of FIG. 5 can implement any of the functionalities and features discussed above, including base station 135. However, the components can also be used to implement camera 105 and camera 305.

For example, FIG. 5 portrays a high-level block diagram illustrating a processing device 500 implementing base station 135 in which at least some operations described herein can be implemented. In some implementations, the block diagram can also implement the other devices described herein, such as camera 105. The processing system can be a system that can run any of the methods/algorithms/techniques described above.

In the illustrated embodiment, the processing device 500 includes one or more processors 505, memory 510, antenna 515, and one or more radios 520. Processors 505 may be or include, for example, one or more general-purpose programmable microprocessors or microprocessor cores, microcontrollers, application specific integrated circuits (ASICs), programmable gate arrays, or the like, or a combination of such devices. The processor(s) 505 control the overall operation of the processing device 500. Memory 510 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 510 may store data and instructions that configure the processor(s) 505 to execute operations in accordance with the techniques described above. Processing device 500 can also include communication devices that may be or include, for example, an Ethernet adapter, cable modem, Wi-Fi adapter, cellular transceiver, Bluetooth transceiver, or the like, or a combination thereof. Depending on the specific nature and purpose of the processing device 500, it can also include I/O devices that can include devices such as a display (which may be a touch screen display), audio speaker, keyboard, mouse or other pointing device, microphone, camera, etc. Processing device 500 can also include radios 520, for example, a different radio for each band that communication links can be established within. Processing device 500 can also include one or more antennas 515 for aiding the establishing of the communication links. For example, radio 520 can generate a signal that is transmitted via antenna 515.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

Figure 6:
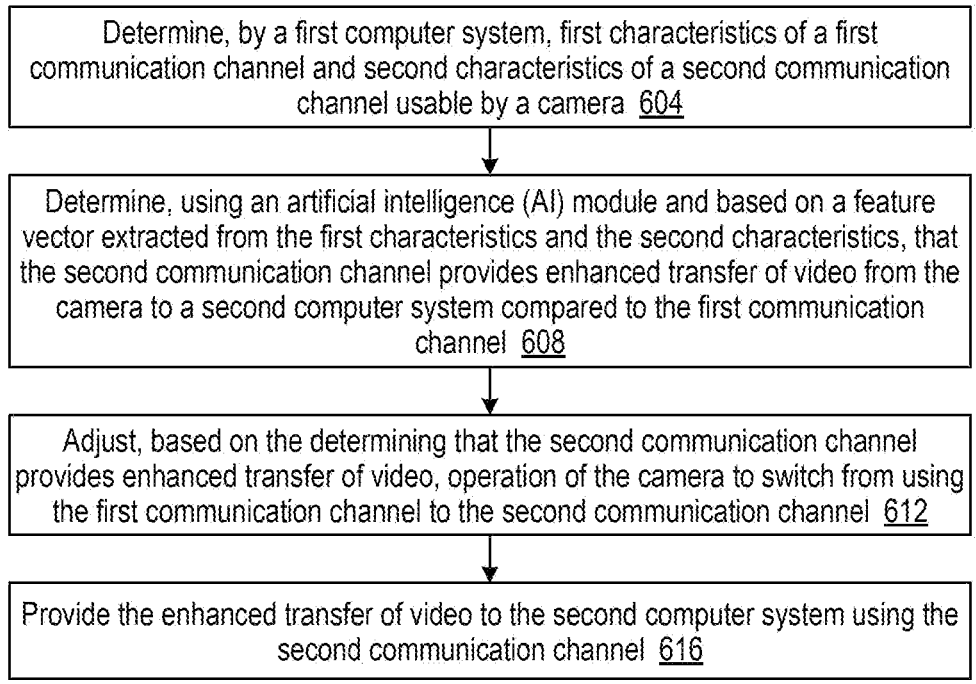
FIG. 6 is a flow diagram illustrating a process for switching communication channels used by a camera, in accordance with one or more embodiments of this disclosure.

FIG. 6 is a flow diagram illustrating a process 600 for switching communication channels used by a camera, in accordance with one or more embodiments of this disclosure. In some implementations, process 600 is performed by base station 135 or camera 105 illustrated and described in more detail with reference to FIG. 1. In some implementations, the process is performed by a computer system, e.g., the example computer system 1200 illustrated and described in more detail with reference to FIG. 12. Particular entities, for example, an XR device, a blockchain node, or an AI system perform some or all of the steps of process 600 in other implementations. Likewise, implementations can include different and/or additional steps or can perform the steps in different orders. Although the process 600 as described herein is a process for switching communication channels used by one camera, the process 600 can also be done using more than one camera, as illustrated and described in more detail with reference to FIG. 3.

In step 604, a first computer system determines first characteristics of a first communication channel and second characteristics of a second communication channel usable by a camera. For example, first characteristics of a first communication channel include network parameters associated with a first network communicably coupling a base station to a camera, and second characteristics of a second communication channel include network parameters associated with a second network communicably coupling a base station to a camera. In some embodiments, the first computer system is part of a base station. Additionally or alternatively, determining the first characteristics can be performed by the processing device 500 of the base station 135 illustrated and described in more detail with reference to FIG. 5. Example characteristics can include communication channel throughput, bit rate, congestion (e.g., the number of cameras using a communication channel), etc. The first communication channel can be communication channel 160 and the second communication channel can be communication channel 165 illustrated and described in more detail with reference to FIGS. 1 and 3. Example characteristics are described in more detail with reference to FIGS. 1-4. Example cameras are illustrated and described in more detail with reference to FIGS. 1 and 3.

The base station is configured to receive a first video from the camera using the first communication channel. An example video 120 is illustrated and described in more detail with reference to FIG. 1. In some embodiments, a request for access to the video is received, e.g., by the base station from an extended-reality (XR) device. The request can include a credential stored in a digital wallet. The credential can be a password, security keys, a cryptographic key, etc. An example digital wallet 1060 is illustrated and described in more detail with reference to FIG. 10B. For example, a user of the base station, a cloud server, or another electronic device (e.g., cloud server 155 and smartphone 140 illustrated and described in more detail with reference to FIG. 1) gains access to the base station or the camera using a credential stored in a digital wallet. In some embodiments, the computer system receives a request for access to the video using self-sovereign identity (SSI). SSI is described in more detail with reference to FIG. 10. For example, a user of the XR device or another electronic device (e.g., smartphone 140 illustrated and described in more detail with reference to FIG. 1) logs into an XR application or gains access to the camera using SSI.

In step 608, the first computer system determines, using an artificial intelligence (AI) module and based on a feature vector extracted from the first characteristics and second characteristics that the second communication channel provides enhanced transfer of video from the camera to a second computer system compared to the first communication channel. For example, extracting the feature vector is performed by the processing device 500 of the base station 135 illustrated and described in more detail with reference to FIG. 5. An example AI module and example feature vectors are described in more detail with reference to FIG. 11.

In some embodiments, an artificial intelligence (AI) model can be trained to increase at least one performance metric of the XR application based on network data. Example training methods are described in more detail with reference to FIG. 11. The performance metrics can include clarity of night-vision images, brightness of images in the video, accuracy of colors in day-vision images, color mapping, etc. In some embodiments, the AI model is trained based on the network data using an XR simulation. XR simulations are described in more detail with reference to FIGS. 7-8. The network data can include stored historical network parameters, changes in network parameters, device parameters etc.

In some embodiments, the first computer system (e.g., the base station) can be in wireless communication with the camera and a cloud server that can receive video data from the camera. An example cloud server 155 is illustrated and described in more detail with reference to FIG. 1. In some embodiments, the second computer system can be in communication with the cloud server to receive video data from the first computer system. In some embodiments, the second computer system is a user device (e.g., smartphone, XR device, etc.). For example, the camera can be associated with the cloud server communicably coupling the base station to an XR device executing an XR application. Example XR devices are illustrated and described in more detail with reference to FIGS. 7 and 8. The XR application can be an XR game or a security monitoring application, e.g., at a mall.

In step 612, the first computer system adjusts, based on the determining that the second communication channel provides enhanced transfer of video, operation of the camera to switch from using the first communication channel to the second communication channel. For example, the first computer system adjusts the operation of the camera 105 from using the first communication channel 160 to the second communication channel 165, as illustrated and described in more detailed with reference to FIG. 1. Adjusting can be performed by the processing device 500 of the base station 135 illustrated and described in more detail with reference to FIG. 5.

In step 616, the first computer system provides the enhanced transfer of video to the second computer system using the second communication channel. In some embodiments, the second communication channel can be used to provide the base station with the enhanced transfer of video using the second communication channel. The base station can be communicably coupled to the cloud server such that the cloud server can provide the enhanced transfer of video to second computer system. As described herein, the second computer system can be a user device (e.g., a smartphone, XR device, etc.). In some embodiments, a motion notification can be provided to the user device in addition to or rather than the enhanced transfer video. An example motion notification 145 is illustrated and described in more detail with reference to FIG. 1.

Additionally or alternatively, the second communication channel can be used to provide the enhanced transfer of video to the XR device for viewing the video on an electronic display of the XR device by the XR application. In some embodiments, for example, an XR system can combine the video provided from the camera (e.g., a first video) with a second video, produced by a camera of the XR device, into an XR video for display on an electronic display of the XR device by the XR application. Combining the two videos can be performed by merging or concatenating the videos. The combining can be constructive (i.e., additive to the second video), or destructive (i.e., masking of the second video). The first video can be seamlessly interwoven with the second video such that it is perceived as an immersive aspect of the XR video. An example XR system 700 is illustrated and described in more detail with reference to FIG. 7. Example cameras are illustrated and described in more detail with reference to FIGS. 1, 3 and 8-9. In some embodiments, the XR video is associated with an electronic game. For example, XR gaming systems generate realistic sensations that simulate users' physical presence in a computer-generated environment. XR gaming systems can let users believe they inhabit a virtual world. Users playing an XR game move around a virtual world and interact with virtual features and items, such as NFTs. For example, the electronic game is associated with a blockchain that stores NFTs for players to earn or interact with while playing the game.

Figure 7:
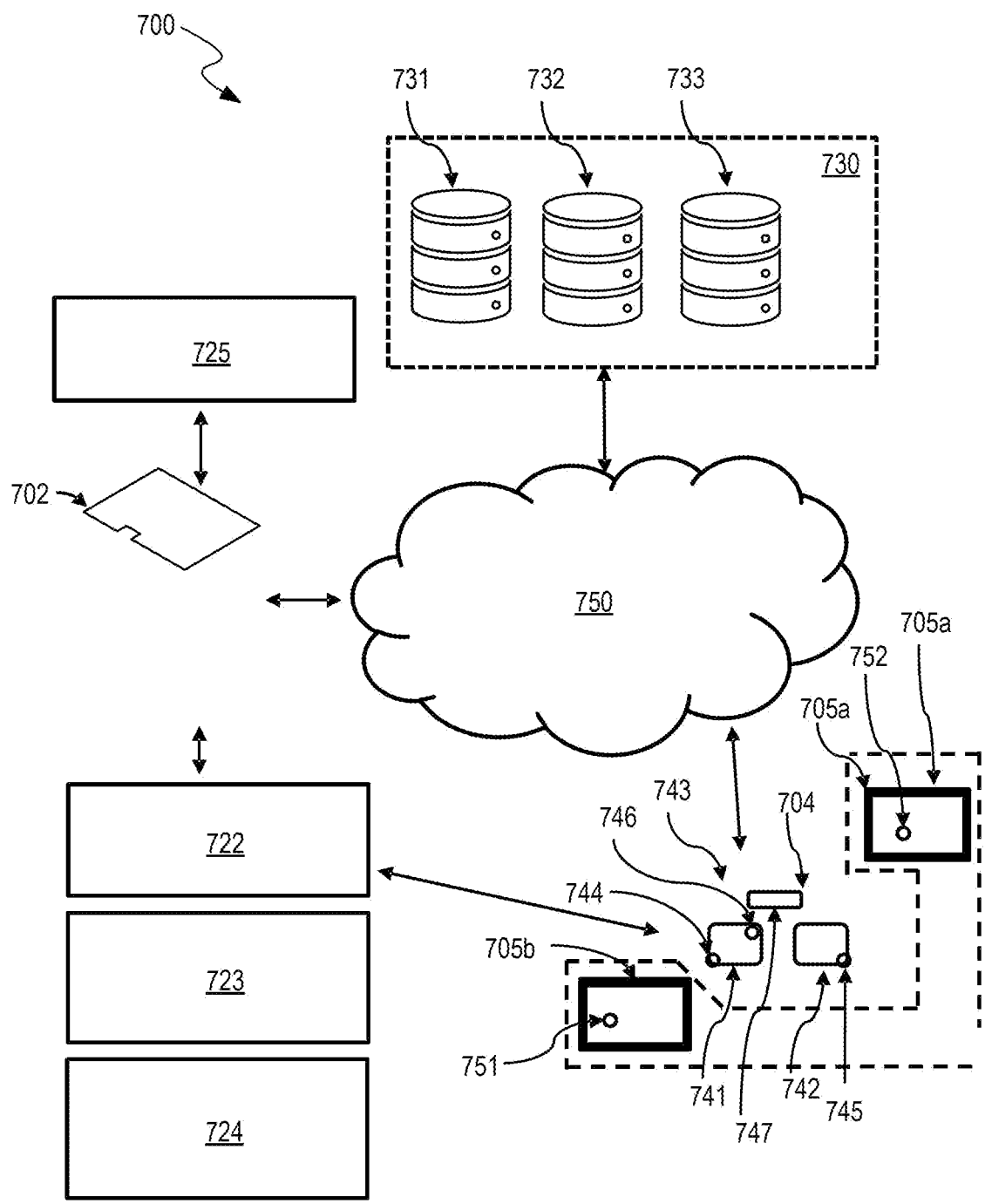
FIG. 7 illustrates an extended-reality (XR) system, in accordance with one or more embodiments of this disclosure.

FIG. 7 illustrates an extended-reality (XR) system 700, in accordance with one or more embodiments. Extended reality is a catch-all term to refer to augmented reality, virtual reality, and mixed reality. The technology is intended to combine or mirror the physical world with a "digital twin world" that is able to interact with each other. System 700 can be used to perform an XR computer-implemented method. For example, system 700 can be used in conjunction with determining characteristics associated with a network communicably coupling (e.g., via a communication channel) a base station to a camera, receiving a video from the camera, etc. Example characteristics associated with a communication channel, an example communication channel, an example base station, and an example camera are described in more detail with reference to FIGS. 1-6.

System 700 can be used to extract a feature vector from network parameters associated with a network (e.g., network 750) communicably coupling the base station to an XR device (e.g., wearable device 704) executing an XR application. In some embodiments, the feature vector can be extracted from first characteristics of a first communication channel and second characteristics of a second communication channel associated with a network (e.g., network 750) and usable by the camera. In some examples, the camera is one of the XR devices' cameras. In some examples, the camera's video can be combined with the XR devices' video. The system 700 can further be used to determine based on a machine learning (ML) system and the feature vector that the second communication channel provides enhanced transfer of a video to a second computer system (e.g., a computer system of the XR device) compared to the first communication channel. The system 700 can adjust the operation of the camera from the first communication channel to the second communication channel based on the determining that the second communication channel provides enhanced transfer of video. Furthermore, the system 700 can provide the enhanced transfer of the video to the second computer system using the second communication channel. The system 700 can also be used to train ML systems. In some embodiments, the second computer system can be a computer system of the XR device, and the video provided can be an XR video for display on an electronic display of the XR device by the XR application. The process for switching communication channels is described in more detail with reference to FIGS. 1-6. The ML system described herein is the same as or similar to the AI system 1100 illustrated and described in more detail with reference to FIG. 11.

System 700 can analyze system performance and then generate additional simulations based on the system performance to simulate the processes described herein any number of times. System 700 can remove, add, or modify actions based on, for example, system performance, user input, predicted events, outcomes, or the like. System 700 can generate an XR environment (e.g., an augmented reality (AR) environment or other environment) with displayed event information (e.g., mappings of moving objects), instrument data (e.g., instrument instructions, operational parameters, etc.), sensor data, user data (e.g., real-time behavior), and other information for assisting the user.

System 700 can include an AR device (e.g., wearable device 704) that provides virtual reality (VR) simulations for monitoring of behavior, activities, or other changing information. VR is a simulated experience that employs pose tracking and 3D near-eye displays to give the user an immersive feel of a virtual world. In some embodiments, system 700 generates an XR simulation environment that includes a digital environment model. The digital model is viewable by at least one user using an AR device, such as the devices illustrated and described in more detail with reference to FIGS. 7-8. The XR simulation environment is configured to enable the at least one user to virtually perform one or more steps on the digital model. For example, the user can identify behavior, activities, or other changing information when viewing a digital twin or a virtual model of the environment.

A different XR platform is used, and a different XR simulation environment is generated for different environment types, e.g., business, home, or mall. A different XR platform is used for each of the above because each platform has different modeling parameters. The modeling parameters can be retrieved from a modeling parameter library for generating a digital model.

Different ML models are used and trained differently for each XR simulation environment generated. For example, an ML model for a mall is trained using training data describing shopper activity, security personnel, movement of goods, traffic, etc. Different XR platforms are used because the error margins between features are different for different environment types. The granularity of features is different in different environments. Therefore, different VR modeling is performed for each environment type, and different software packages are designed. The ML models are the same as or similar to the AI model 1130 of the AI system 1100 illustrated and described in more detail with reference to FIG. 11.

VR training can also include identifying features (e.g., people or vehicles), equipment, vehicle positions, and other data to assist in monitoring of behavior, activities, or other changing information. User input (e.g., labels, position notes, or the like) can be collected (e.g., voice, keyboard, XR device input, etc.) during the simulations and then used to modify planned procedures, provide annotation during procedures using XR environments, or the like.

In some embodiments, system 700 receives feature mapping information from the at least one user via the XR device (e.g., VR device, AR device, etc.). In some embodiments, the same XR device is used to perform VR simulations to input mapping information and perform AR-assisted monitoring on the environment based on the mapping information. In other embodiments, different XR devices are used for training and performing the monitoring of behavior, activities, or other changing information. In some training procedures, multiple users input mapping information, which is aggregated to determine what information is correct. The aggregation can be used to determine confidence scoring for XR mapping. For example, a confidence score for AR mapping is based on a threshold percentage (e.g., at least 80%, 90%, 95%, or 99%) of the users providing the same mapping (e.g., mapping input using an XR environment).

In response to the confidence score reaching a threshold level for features associated with an environment, the mapping can be deployed for performing monitoring of behavior, activities, or other changing information. In AR/VR-assisted monitoring, wearable device 704 can display information to assist the user. The displayed information can include environmental information (e.g., instrument information, movement in a vicinity, or potential adverse events), and other information to assist the user. The user can move, add, or eliminate displayed information to enhance the experience. The configuration of the wearable device 704, information displayed, and feedback provided to the user can be selected based on procedures to be performed.

In some embodiments, system 700 performs confidence-score AR mapping to meet a confidence threshold for an environment. The confidence-score AR mapping includes selecting at least a portion of the mapping information for the AR mapping to the environment. The selected mapping information is mapped to the environmental features. Via the AR device, an AR environment is displayed to the at least one user. The AR environment includes the mapping of the selected mapping information to the features.

In some embodiments, the confidence threshold (e.g., 90%, 95%, or 99%) is selected based on an environmental type. Image/video data of the environment is segmented to identify digital features associated with the environment. For example, identification is performed using the AI system 1100 of FIG. 11. The digital features are part of the digital environment model. Via a VR device, one or more identification prompts are generated for receiving the environmental mapping information from the at least one user to label one or more discrete features viewed by the user. The discrete features associated with the environment can be identified using one or more ML algorithms.

The AR environment includes the mapping of the selected environmental mapping information to the environmental features. In some embodiments, the computer system maps at least some of the features of the environment using an ML platform. The ML platform includes a plurality of environment-type-specific ML modules to be applied to the image/video data of the environment to provide the environmental mapping. The environment-type-specific ML modules can be trained using environment-type grouped data sets, including environment-type mappings. Environment-type mappings can include layers based on the environment type. For example, a mall mapping can include layers showing features such as people, baggage, and vehicles. A home mapping can include layers showing landscaping, patios, walls, etc. The user can select layers, data sets, and mapping information to be added or removed from the environment-type data. For example, each platform includes a different feature extraction module, a different ML model, and different training methods. The ML platform, ML modules, ML models are the same as or similar to the AI platform, AI modules, and AI models illustrated and described in more detail with reference to FIG. 11.

System 700 includes a server (or other computer system 702), where such system 702 includes one or more non-transitory storage media storing program instructions to perform one or more operations of a projection module 722, a display module 723, or a feedback module 724. In some embodiments, the second computer system provided the enhanced transfer of video is the system 702. In some embodiments, system 700 includes wearable device 704, where the wearable device 704 may include one or more non-transitory storage media storing program instructions to perform one or more operations of the projection module 722, the display module 723, or the feedback module 724.

Wearable device 704 can be a VR headset, such as a head-mounted device that provides VR for the wearer. Wearable device 704 can be used in applications, including simulators and trainers for monitoring of behavior, activities, or other changing information. Wearable device 704 typically includes a stereoscopic display (providing separate images for each eye), stereo sound, and sensors like accelerometers and gyroscopes for tracking the pose of the user's head to match the orientation of the virtual camera with the user's eye positions in the real world. The user can be a security professional or a user laying an AR game. Wearable device 704 can also have eye-tracking sensors and controllers. Wearable device 704 can use head-tracking, which changes the field of vision as a user turns their head.

Wearable device 704 can include imagers, sensors, displays, feedback devices, controllers, or the like. The wearable device 704 can capture data, locally analyze data, and provide output to the user based on the data. A controller of the wearable device 704 can perform local computing (e.g., edge computing) with or without communicating with a remote server and can store edge computing ML libraries locally analyzing data to provide output. This allows onboard processing to be performed to avoid or limit the impact of, for example, network communications. Edge computing is a distributed computing paradigm that brings computation and data storage closer to the sources of data. This improves response times and saves bandwidth. Edge computing is an emerging computing paradigm which refers to a range of networks and devices at or near the user. Edge computing processes video data closer to the electronic devices, enabling processing at greater speeds and volumes, leading to greater action-led results in real time.

System 700 can include one or more wearable devices configured to be worn on other parts of the body. The wearable devices can include, for example, gloves (e.g., haptic feedback gloves or motion-tracking gloves), wearable glasses, loops, heart monitors, heart rate monitors, or the like. These wearable devices can communicate with components of the system 700 via wire connections, optical connections, wireless communications, etc. The wearable device 704 can also communicate with external sensors and equipment. The wearable device 704 can receive data (sensor output, equipment output, operational information for instruments, etc.) and display the received information to the user. This allows the user to view sensor data without turning their attention away from a monitoring site.

System 700 can include a set of external displays 705 (e.g., accessories of the wearable device 704, desktop monitors, television screens, or other external displays), where the set of external displays 705 may be provided instructions to display visual stimuli based on measurements or instructions provided by the wearable device 704 or the server 702. In some embodiments, the wearable device 704 may communicate with various other electronic devices via a network 750, where the network 750 may include the Internet, a local area network, a peer-to-peer network, etc.

The wearable device 704 may send and receive messages through the network 750 to communicate with a server 702, where the server 702 may include one or more non-transitory storage media storing program instructions to perform one or more operations of a statistical predictor 725. It should further be noted that while one or more operations are described herein as being performed by particular components of the system 700, those operations may be performed by other components of the system 700 in some embodiments. For example, operations described in this disclosure as being performed by the server 702 may instead be performed by the wearable device 704, where program code or data stored on the server 872 may be stored on the wearable device 704 or another client computer device instead. Similarly, in some embodiments, the server 702 may store program code or perform operations described as being performed by the wearable device 704. For example, the server may perform operations described as being performed by the projection module 722, the display module 723, or the feedback module 724. Furthermore, although some embodiments are described herein with respect to ML models, other prediction models (e.g., a statistical model) may be used instead of or in addition to ML models. For example, a statistical model may be used to replace a neural network model in one or more embodiments. The ML models are the same as or similar to the AI model 1130 of the AI system 1100 as illustrated and described in more detail with reference to FIG. 11.

In some embodiments, the system 700 may present a set of stimuli (e.g., shapes, text, video, or images) on a display of the wearable device 704. The wearable device 704 may include a case 743, a left transparent display 741, and a right transparent display 742, where light may be projected from emitters of the wearable device through waveguides of the transparent displays 741-742 to present stimuli viewable by an eye(s) of a user wearing the wearable device 704. The wearable device 704 also includes a set of outward-facing sensors 747, where the set of outward-facing sensors 747 may provide sensor data indicating the physical space around the wearable device 704. In some embodiments, the set of outward-facing sensors 747 may include cameras, infrared sensors, lidar sensors, radar sensors, etc. In some embodiments, the sensors 747 can be inward-facing to monitor the user's state (e.g., level of stress, alertness level, etc.).

In some embodiments, the sensors 747 can be cameras that capture images of the environment, people, equipment, user, or the like. The captured images can be used to analyze steps being performed, the environment state, and/or the surrounding environment. This allows the system 700 to provide comprehensive analytics during procedures. For example, output from the sensors 747 of the wearable device 704 can be used to analyze the concentration/focus level of the user, alertness of the user, and stress level of the user (e.g., stress level calculated based on user metrics, such as heart rate, blood pressure, or breathing pattern), and other metrics. In some embodiments, if the user becomes unable to maintain a threshold level of focus, the system 700 can modify the processes described herein such that critical steps are performed by another user, a robotic system, or using alternative techniques.

In some embodiments, sensors 747 can track the wearer's eyes and provide feedback to the user to encourage the user to focus on targeted regions for visualization. This can help train the user to focus attention on regions or areas for actions or monitoring of behavior, activities, or other changing information. The wearable device 704 can receive and store plans, data, and other information sufficient to allow one or more security steps to be performed with or without remote communications. This ensures that security steps can be completed if there is communication failure at the environment.

In some procedures, the system 700 can develop one or more training simulations for a user. The user can perform the simulations for manual procedures, robotically assisted processes, or robotic processes (e.g., moving a camera or audio equipment). The system 700 can adaptively update the simulations based on desired procedure criteria, such as process time, predicted outcome, safety, outcome scores, or the like. This allows the system 700 to develop security plans suitable for the security procedures while training the user. In some embodiments, the wearable device 704 can collect user input to synchronize the user's input with a security procedure. For example, the system 700 can develop security plans with security steps for appropriate time periods based on threshold metrics. If the user becomes fatigued or tired, security steps can be shortened, reduced, or assigned to other users. Other users can use other wearable devices that are synchronized to communicate with the wearable device 704 to provide coordinated operation between users.

In some embodiments, system 700 receives an environment type. A digital environmental model is generated based on the environment type. The digital environmental model includes environmental information associated with a portion of the environmental features. For example, system 700 retrieves modeling parameters for generating the digital environmental model based on one or more security steps. The digital environmental model is generated according to the modeling parameters. The modeling parameters can include, for example, one or more parametric modeling parameters, model properties (e.g., thermal properties), fluid modeling parameters, mesh parameters (e.g., parameters for generating 3D meshes), kinematic parameters, boundary conditions, loading parameters, biomechanical parameters, fluid dynamic parameters, thermodynamic parameters, etc. The environmental features are identified within the digital environmental model. Environmental characteristics are assigned to the identified environmental features for viewing by the at least one user. The environmental characteristics can include, for example, one or more environmental feature statuses (e.g., crowded, sparse, high traffic), area properties, sizes of environmental features, etc.

In some embodiments, system 700 retrieves modeling parameters for generating the environmental model based on one or more security steps. The digital model is generated according to the modeling parameters. The environmental features are identified within the digital model. Environmental characteristics are assigned to the identified environmental features for viewing by the at least one user. For example, the modeling parameters define three-dimensional (3D) objects in an XR or AR environment that can be moved with a number of degrees of freedom (e.g., six degrees of freedom) using a controller (e.g., cursor). Modeling the identified features enables a user to experiment with perspective compared to traditional software.

The XR simulation environment can include polygonal modeling, e.g., connecting points in 3D space (vertices) by line segments to form a polygonal mesh. For example, the XR simulation environment includes textured polygonal meshes that are flexible and/or planar to approximate curved surfaces. In some embodiments, curve modeling (defining surfaces by curves that are influenced by weighted control points) is used. For example, performing security steps virtually on the digital model uses digital sculpting (also known as sculpt modeling or 3D sculpting) to cut, push, pull, smooth, grab, pinch or otherwise manipulate virtual features.

Generating the digital model is performed by developing a mathematical coordinate-based representation of different surfaces of the features in three dimensions by manipulating edges, vertices, and polygons in the simulated XR environment. The digital model represents the physical environment using a collection of points in 3D space, connected by different geometric entities such as lines and curved surfaces, etc. In embodiments, the digital model can be created by procedural modeling or scanning based on imaging methods. The digital model can also be represented as a 2D image using 3D rendering.

The AR mapping to the environment can include solid models that define a volume of the environmental feature they represent, mapped using constructive solid geometry. One or more correlations are determined between the environmental mapping information and at least one security state, e.g., at an oil and gas facility. A confidence-score AR mapping engine is updated based on the determination. The confidence-score AR mapping engine is configured to perform confidence-score AR mapping for other scenarios in new AR environments.

The environmental mapping information can include shells or boundaries that represent surfaces of the environmental features. The AR environment displayed to the at least one user can include polygonal meshes representing the physical features, subdivision surfaces, or level sets for deforming surfaces that can undergo topological changes. The AR mapping process can include transforming digital representations of the features into polygonal representations (polygon-based rendering) of the features overlaid on images of the physical features.

Furthermore, the system 700 may present stimuli on the set of external displays 705 during a visual testing operation. While the set of external displays 705 is shown with two external displays, a set of external displays may include more or fewer external displays, such as only one external display or more than two external displays. For example, a set of external displays may include four external displays, eight external displays, nine external displays, or some other number of external displays. The external displays may include one or more types of electronic displays, such as computer monitors, smartphones, television screens, laptop devices, tablet devices, LED devices, LCD devices, and other types of electronic displays, etc. In some embodiments, the external display may include a projector, where the location of the external display may include a wall or screen onto which one or more stimuli is projected. In some embodiments, the external display may itself be transparent or partially transparent.

During or after a visual testing operation, the system 700 may obtain feedback information related to the set of stimuli, where the feedback information may indicate whether or how an eye responds to one or more stimuli of the set of stimuli. For example, some embodiments may use the wearable device 704 to collect feedback information that includes various eye-related characteristics. In some embodiments, the feedback information may include an indication of a response of an eye to the presentation of a dynamic stimulus at a first display location 746 on a wearable device 704. Alternatively, or in addition, the feedback information may include an indication of a lack of a response to such a stimulus. The response or lack of response may be determined based on one or more eye-related characteristics, such as an eye movement, a gaze direction, a distance in which an eye's gaze traveled in the gaze direction, a pupil size change, a user-specific input, etc. In some embodiments, the feedback information may include image data or results based on image data. For example, some embodiments may obtain an image or sequence of images (e.g., in the form of a video) of an eye captured during a testing operation as the eye responds to a stimulus.

In some embodiments, the system 700 may track the ocular data of an eye and update associated ocular information based on feedback information indicating eye responses to stimuli. Some embodiments may use a prediction model to detect a non-responsive region of a visual field, or another ocular issue of a visual field portion associated with the ocular data. In some embodiments, satisfying a set of vision criteria for a visual field location may include determining whether an eye responded to a stimulus presented at the display location mapped to the visual field location, where different presented stimuli may vary in brightness, color, shape, size, etc.

In some embodiments, the system 700 can adjust viewing by the user based on the ocular information collected by the wearable device 704. Any number of simulations can be performed to generate ocular information suitable for determining optimal settings for a user. The settings can change throughout a security procedure based on security steps. For example, if the user becomes tired or fatigued, the system 700 can adjust the visual field to stimulate the user, thereby increasing attentiveness, e.g., in a war zone or combat scenario. In some embodiments, the user can adjust the stimuli to his or her preferred preferences. Other responses can be collected and associated with the security procedure, specific security steps, or the like. Feedback scores can be generated to rank the collected set of stimuli. The score can be based on the time to complete action, biometric levels of the user (e.g., state of stress or heart rate), or other metrics.

In some embodiments, data used or updated by one or more operations described in this disclosure may be stored in a set of databases 730. In some embodiments, the server 702, the wearable device 704, the set of external displays 705, or other computer devices may access the set of databases to perform one or more operations described in this disclosure. For example, a prediction model used to determine ocular information may be obtained from a first database 731, where the first database 731 may be used to store prediction models or parameters of prediction models. Alternatively, or in addition, the set of databases 730 may store feedback information collected by the wearable device 704 or results determined from the feedback information. For example, a second database 732 may be used to store a set of user profiles that include or link to feedback information corresponding with eye measurement data for the users identified by the set of user profiles. Alternatively, or in addition, the set of databases 730 may store instructions indicating different types of testing procedures. For example, a third database 733 may store a set of testing instructions that causes a first stimulus to be presented on the wearable device 704, then causes a second stimulus to be presented on a first external display 705a, and thereafter causes a third stimulus to be presented on a second external display 705b.

In some embodiments, the projection module 722 may generate a field-to-display map that maps a position or region of a visual field with a position or region of the set of external displays 705 or of an AR interface displayed on the left transparent display 741 or the right transparent display 742. The field-to-display map may be stored in various forms, such as in the form of a set of multi-dimensional arrays, a function, a subroutine, etc. For example, the field-to-display map may include a first multi-dimensional array, where the first two dimensions of the first array may indicate a coordinate in a combined display space that maps 1:1 with a visual field. In some embodiments, a third dimension of the first array may identify which external display or wearable display to use when presenting a stimulus. Furthermore, a fourth and fifth dimension of the array may be used as coordinates relative to the origin of each respective external display. In some embodiments, an array or other set of numbers described in this disclosure may instead be divided into a plurality of arrays or other subsets of numbers. In some embodiments, the field-to-display map may be used in reverse, such that a display location may be mapped to a visual field location ("field location") using the field-to-display map. Some embodiments pre-generate a display-to-field map by inverting one or more of the arrays described above. Furthermore, some embodiments may use or update a map by using an array or other data structure of the map. Various other embodiments of the field-to-display map are possible, as described elsewhere in this disclosure.

In some embodiments, the projection module 722 may obtain sensor information from the set of outward-facing sensors 747, where the sensor information may include position measurements of the set of external displays 705. For example, a user wearing the wearable device 704 may rotate or translate their head, which may cause a corresponding rotation or translation of the wearable device 704. Some embodiments may detect these changes in the physical orientation or position of the wearable device 704 with respect to the set of external displays 705. Some embodiments may then perform a mapping operation to determine the positions and orientations of the set of external displays based on the sensor information collected by the set of outward-facing sensors 747.

In some embodiments, the projection module 722 may update a field-to-display map that stores or otherwise indicates associations between field locations of a visual field and display locations of the left transparent display 741, the right transparent display 742, or the set of external displays 705. For example, the set of outward-facing sensors 747 may include one or more cameras to collect visual information from a surrounding area of the wearable device 704, where the visual information may be used to determine a position or orientation of one or more devices of the set of external displays 705. As the wearable device 704 is moved, some embodiments may continuously obtain sensor information indicating changes to the external environment, including changes in the position or orientation of the set of external displays 705 relative to the position or orientation of the wearable device 704. For example, some embodiments may generate a point cloud representing the surfaces of objects around the wearable device 704 and determine the positions and orientations of the set of external displays 705 relative to the wearable device 874 based on the point cloud. Furthermore, some embodiments may continuously update the field-to-display map as new sensor information is collected by the set of outward-facing sensors 747.

In some embodiments, the display module 723 may present a set of stimuli on the wearable device 704 or the set of external displays 705. In some embodiments, the left transparent display 741 and right transparent display 742 may be positioned with respect to the case 743 to fit an orbital area on a user such that each display of the transparent displays 741-742 is able to collect data and present stimuli or other images to the user. The left transparent display 741 and right transparent display 742 may contain or be associated with an electronic display configured to present re-created images to an eye viewing the respective transparent display. In various embodiments, electronic display may include a projector, display screen, and/or hardware to present an image viewable by the eye. In some embodiments, a projector of an electronic monitor may be positioned to project images onto an eye of the subject or onto or through a screen, glass, waveguide, or other material. For example, the display module 723 may cause a fixation point or another visual stimulus to be projected onto the first display location 746, where the fixation point at the first display location 746 may then be viewed by an eye of a user wearing the wearable device 704.

In some embodiments, the display module 723 may cause a set of stimuli to be displayed onto electronic displays other than the displays of the other external displays, such as an external display of the set of the external displays 705. For example, after presenting a stimulus on a display of the wearable device 704, the display module 723 may cause a stimulus to be presented on the second external display 705b at a second display location 751. As used in this disclosure, an external display location may include a display location on an external display. The display module 723 may then proceed to display additional stimuli on an additional location of the first external display 705a, the wearable device 704, or the second external display 705b.

Some embodiments may determine the display location for a stimulus by first determining the location or region of a visual field. After determining the location or region of the visual field, some embodiments may then use a field-to-display map to determine which display location of the left transparent display 741, the right transparent display 742, or the set of external displays 705 to use when displaying a stimulus. For example, some embodiments may determine that a previous sequence of sensor measurements indicated that a first region of a visual field has not yet been tested and select this first region for testing. Some embodiments may then use the field-to-display map to determine a third display location 752 on the first external display 705a and, in response to selecting the third display location 752, display a stimulus at the third display location 752. As described elsewhere in this disclosure, some embodiments may measure eye movements or otherwise measure responses of an eye to the stimuli presented on the set of external displays 705 to measure a visual field of the eye. Furthermore, as described in this disclosure, a visual field location of a stimulus may include the field location mapped to or otherwise associated with the display location of the stimulus, where the mapping or association between the display and the field location is determined by a field-to-display map. Similarly, as used in this disclosure, a gaze location that is located at a field location may also be described as being located at a display location mapped to the field location.

In some embodiments, the feedback module 724 may record feedback information indicating eye responses to the set of stimuli presented on the wearable device 704 or the set of external displays 705. In some embodiments, the transparent displays 741-742 may include a left inward-directed sensor 744 and a right inward-directed sensor 745, where the inward-directed sensors 744-745 may include eye-tracking sensors. The inward-directed sensors 744-745 may include cameras, infrared cameras, photodetectors, infrared sensors, etc. For example, the inward-directed sensors 744-745 may include cameras configured to track pupil movement and determine and track the visual axes of the subject. In some embodiments, the inward-directed sensors 744-745 may include infrared cameras and be positioned in lower portions relative to the transparent displays 741-742. The inward-directed sensors 744-745 may be directionally aligned to point toward a presumed pupil region for line-of-sight tracking or pupil tracking.

In some embodiments, the feedback module 724 may use the inward-directed sensors 744-745 to collect feedback information indicating eye motion as an eye responds to different stimuli. For example, the feedback module 724 may retrieve feedback information of an eye collected by the inward-directed sensors 744-745 as the eye responds to the presentation of a stimulus at the first display location 746 and the second display location 751. By collecting feedback information while stimuli are presented on both the wearable device 704 and one or more devices of the set of external displays 705, some embodiments may increase the boundaries of a visual field for which ocular data may be detected.

In some embodiments, the statistical predictor 725 may retrieve stimuli information, such as stimuli locations and characteristics of the stimuli locations, where the stimuli locations may include locations on the set of external displays 705. The statistical predictor 725 may also retrieve training outputs indicative of the presence or absence of ocular responses or other outputs of a prediction model. The statistical predictor 725 may then provide the set of stimuli information and training outputs to a ML model to update the parameters of the ML model to predict ocular responses based on new inputs. An example AI system 1100 is illustrated and described in more detail with reference to FIG. 11. Alternatively, or in addition, the statistical predictor 725 may use statistical models or rules to determine ocular responses and generate a visual field map representing a visual field of an eye, where one or more regions of the visual field map may be associated with a set of ocular responses or otherwise include ocular response information.

Figure 8:
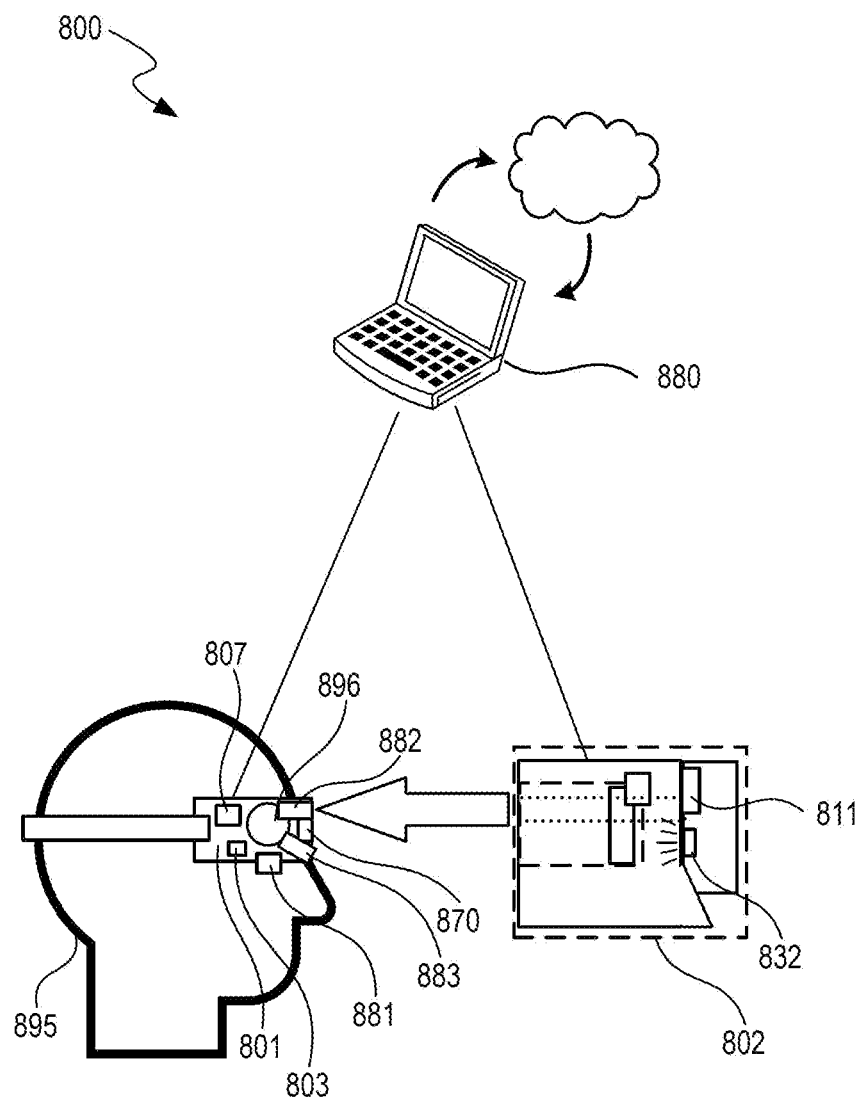
FIG. 8 illustrates an XR head mounted display (HMD), in accordance with one or more embodiments of this disclosure.

FIG. 8 illustrates an XR HMD 801, in accordance with one or more embodiments. HMD 801 can be, for example, an augmented reality device worn by a user while the user views a particular environment. Information can be displayed at selected locations to avoid obstructing the viewing of targeted areas. A user 895 (e.g., video gamer or security professional) can wear HMD 801, which can include a computing device 807. Computing device 807 can include a processor, microprocessor, controller, or other circuitry. In some embodiments, an eye 896 of the user may be capable of viewing images and video in XR from the operating room 802 through lenses 870 of the HMD 801. The HMD 801 may include an interior-facing camera to capture eye-related information and a set of exterior-facing cameras that include an exterior-facing camera 882.

In some embodiments, a user initiates an XR session using computing system 880 that is in communication with the HMD 801. Computing system 880 may include a stand-alone computer capable of operating without connecting to another computing device outside of a local network. Alternatively, or in addition, the computing system 880 may include a computing system that receives program instructions or required data from an external data source not available through a local network.

In some embodiments, the computing system 880 may initiate an XR session. Computing system 880 may communicate with the HMD 801 via a wireless connection or wired connection. For example, the computing system 880 may send a wireless message to the computing device 807 to initiate an XR session. For example, the computing system 880 may send a command to the HMD 801 via a Bluetooth® connection, where the command may cause the HMD 801 to activate.

In some embodiments, the computing system 880 may communicate with the HMD 801 to perform one or more operations. For example, the HMD 801 may present an initial set of instructions to user 995 and request a response from user 895. After user 895 provides a requested response (e.g., pressing a button, making a statement, etc.), the computing system 880 may send a first set of instructions to the HMD 801 to calibrate readings to more accurately measure eye-related data associated with the eye 896. After the HMD 801 sends a message to the computing system 880 that calibration operations have been completed, the computing system 880 may send further instructions to the HMD 801. The computing system 880 may determine the position of a fixation point based on eye-related readings and send a message to the HMD 801 that causes the HMD 801 to display a visual stimulus at the fixation point on the lenses 870. After receiving a message from the HMD 801 that the eye 896 has set its gaze at the fixation point, the computing system 880 may continue the XR session.

In some embodiments, an application executed by the computing device 807 of the HMD 801 may be used to control operations of components of the HMD 801 or other electronic components. For example, the application executed by computing device 807 may begin a visual test program and send a wireless message to a circuitry of the system 880 using a wireless headset communication subsystem 803. The wireless message may be based on one of various types of communication standards, such as a Bluetooth® standard, a Wi-Fi Direct standard, a NFC standard, a ZigBee® standard, a 6LoWPAN standard, etc.

In some embodiments, an application being executed by the computing device 907 may retrieve data from the interior-facing camera 883 and send instructions to control equipment based on this data. For example, the computing device 807 may execute an application to perform a Viola-Jones object detection framework to detect an eye in a set of images using a boosted feature classifier based on video data provided by the interior-facing camera 883. Furthermore, the application executed by the computing device 807 may permit additional sensor data to trigger equipment in a room 802, such as by receiving voice instructions captured from a microphone 881, motion detected by the exterior-facing camera 882, feeling a set of touches on the housing of the HMD 801, etc.

In some embodiments, a testing application executed by the computing device 807 detects that a gaze location of user 895 is focused on a target user interface (UI) element or a target direction based on data collected by interior-facing camera 883. For example, HMD 801 displays a set of instructions that causes user 895 to look at a target UI location. In some embodiments, the target UI location is represented by a target region associated with the target UI location, such that a gaze location determined to be within the target region is considered to be focused on the target UI location. In response to a determination that the gaze location of eye 896 is focused on the target UI location based on images provided by the interior-facing camera 883, the application can activate equipment 832. Furthermore, the application can send a message to a robotic system 811 to turn off equipment 832 based on a determination that the target UI location is no longer a focus of the user's gaze. Alternatively, some embodiments may forego waiting for user 895 to focus on a particular UI location or a particular direction before activating the equipment 832.

In additional embodiments, a computer system obtains environmental data, e.g., from camera 105 of FIG. 1. A user-mapping program is used to train an intra-operative AR mapping platform based on the obtained data (audio, images, video, etc.). For example, the user-mapping program is configured to receive user input for the identification of environmental features/objects. One or more environmental features are identified based on the obtained data. The computer system performs an intra-operative AR mapping of the identified one or more features using the trained intra-operative AR mapping platform. Via an AR device, the intra-operative AR mapping is displayed to be viewed by a user.

In some embodiments, performing the intra-operative AR mapping includes determining one or more features to be identified. The one or more features are identified. The one or more features and associated information are labeled. For example, one or more unidentifiable features are marked. In some embodiments, an autonomous mapping platform is used to perform the intra-operative AR mapping. The autonomous mapping platform is trained by multiple users inputting data for reference images and validated for autonomously mapping a set of features associated with an environment.

In some embodiments, a computer system selects one or more candidate features of a virtual environmental model in a VR environment displayed to a user. For example, the candidate features can be edges, points, or object parts. User input is received for the selected one or more candidate features. The computer system determines whether the user input for one or more candidate features reaches a threshold confidence score. In response to the user input reaching the threshold confidence score, the user input is identified as accurately labeling the one or more candidate features. In some embodiments, a computer system stores the user input as reference label data for the corresponding one or more candidate features. For example, the user input includes a label for each one of the respective one or more candidate features.

In some embodiments, determining whether the user input for one or more candidate features reaches the threshold confidence score is based on a comparison reference user input for similar candidate features. For example, the user input is used to train a ML model. For each of the candidate features, the user input can include at least one of a name of the candidate feature or user annotation.

Figure 9:
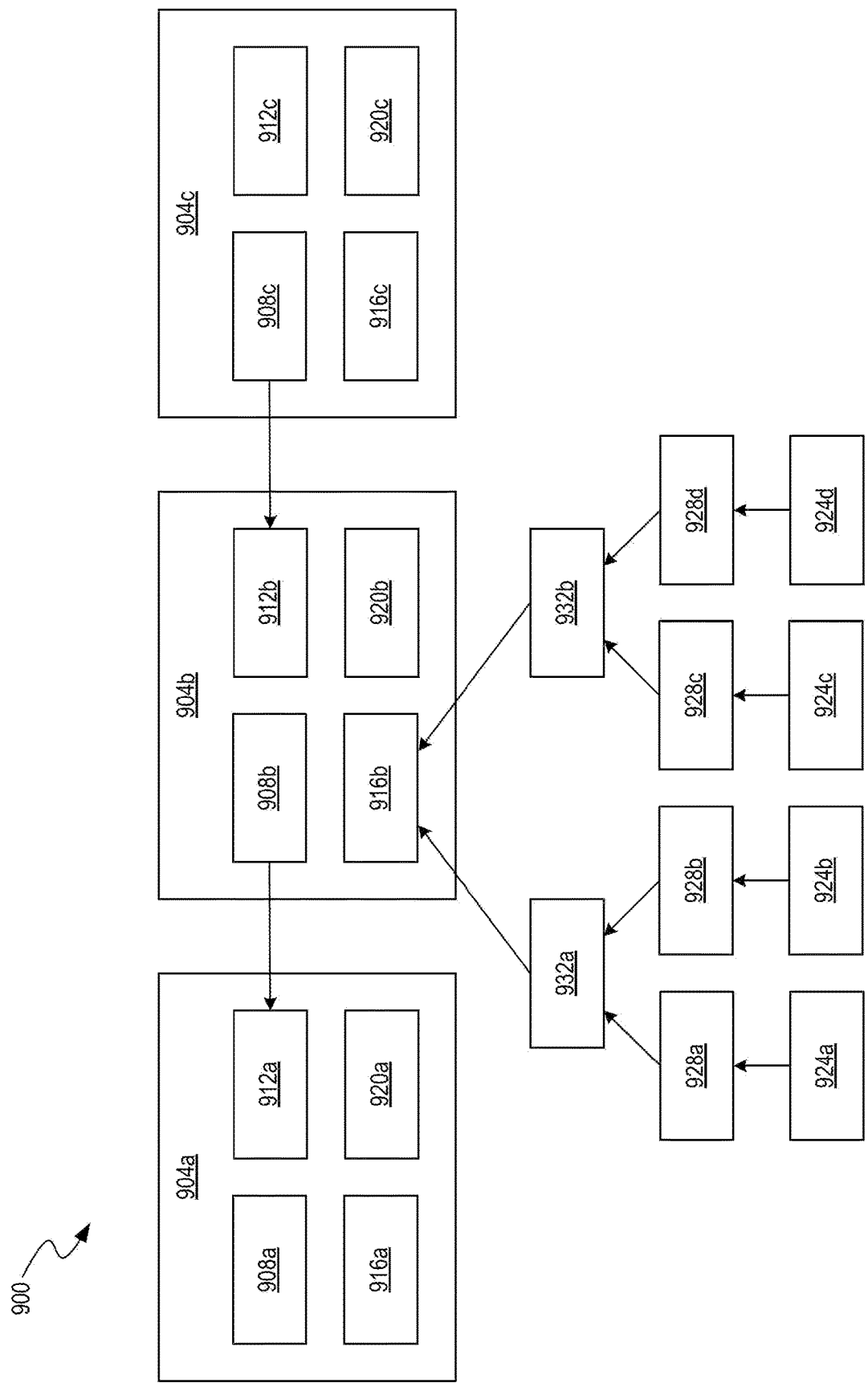
FIG. 9 is a block diagram illustrating components of at least a portion of an exemplary blockchain system, in accordance with one or more embodiments of this disclosure.

FIG. 9 is a block diagram illustrating components of at least a portion of an example blockchain system 900, in accordance with one or more embodiments of this disclosure. Blockchain system 900 includes blockchain 904. In embodiments, the blockchain 904 is a distributed ledger of transactions (e.g., a continuously growing list of records, such as records of transactions for digital assets such as cryptocurrency, bitcoin, or electronic cash) that is maintained by a blockchain system 900. For example, the blockchain 904 is stored redundantly at multiple nodes (e.g., computers) of a blockchain network. Each node in the blockchain network can store a complete replica of the entirety of blockchain 904. In some embodiments, the blockchain system 900 implements storage of an identical blockchain at each node, even when nodes receive transactions in different orderings. The blockchain 904 shown by FIG. 9 includes blocks such as block 904a, block 904b, and/or block 904c. Likewise, embodiments of the blockchain system 900 can include different and/or additional components or be connected in different ways.

The terms "blockchain" and "chain" are used interchangeably herein. In embodiments, the blockchain 904 is a distributed database that is shared among the nodes of a computer network. As a database, the blockchain 904 stores information electronically in a digital format. The blockchain 904 can maintain a secure and decentralized record of transactions (e.g., transactions such as transaction 924a and/or transaction 924b). For example, the ERC-721 or ERC-1155 standards are used for maintaining a secure and decentralized record of transactions. The blockchain 904 provides fidelity and security for the data record. In embodiments, blockchain 904 collects information together in groups, known as "blocks" (e.g., blocks such as block 904a, block 904b, and/or block 904c) that hold sets of information.

The blockchain 904 structures its data into chunks (blocks) (e.g., blocks such as block 904a, block 904b, and/or block 904c) that are strung together. Blocks (e.g., block 904c) have certain storage capacities and, when filled, are closed and linked to a previously filled block (e.g., block 904b), forming a chain of data known as the "blockchain." New information that follows a freshly added block (e.g., block 904b) is compiled into a newly formed block (e.g., block 904c) that will then also be added to the blockchain 904 once filled. The data structure inherently makes an irreversible timeline of data when implemented in a decentralized nature. When a block is filled, it becomes a part of this timeline of blocks. Each block (e.g., block 904a) in the blockchain system 900 is given an exact timestamp (e.g., timestamp 912a) when it is added to the blockchain system 900. In the example of FIG. 9, blockchain system 900 includes multiple blocks. Each of the blocks (e.g., block 904a, block 904b, block 904c) can represent one or multiple transactions and can include a cryptographic hash of the previous block (e.g., previous hashes 908a-c), a timestamp (e.g., timestamps 912a-c), a transactions root hash (e.g., 916a-c), and a nonce (e.g., 920a-c). A transactions root hash (e.g., transactions root hash 916b) indicates the proof that the block 904b contains all the transactions in the proper order. Transactions root hash 916b proves the integrity of transactions in the block 904b without presenting all transactions.

In embodiments, the timestamp 912a-c of each of corresponding blocks of block 904a, block 904b, block 904c includes data indicating a time associated with the block. In some examples, the timestamp includes a sequence of characters that uniquely identifies a given point in time. In one example, the timestamp of a block includes the previous timestamp in its hash and enables the sequence of block generation to be verified.

In embodiments, nonces 920a-c of each of corresponding blocks of block 904a, block 904b, block 904c include any generated random or semi-random number. The nonce can be used by miners during proof of work (PoW), which refers to a form of adding new blocks of transactions to blockchain 904. The work refers to generating a hash that matches the target hash for the current block. For example, a nonce is an arbitrary number that miners (e.g., devices that validate blocks) can change in order to modify a header hash and produce a hash that is less than or equal to the target hash value set by the network.

As described above, each of blocks of block 904a, block 904b, block 904c of blockchain 904 can include respective block hash, e.g., transactions root hash 916a, transactions root hash 916b, and transactions root hash 916c. Each of block hashes 916a-c can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 9, block 904b records transactions 924a-d. Each of the leaf nodes 928a-d contain a hash corresponding to transactions 924a-d respectively. As described above, a hash (e.g., the hash in leaf node such as node 928a) can be a hash of components of a transaction (e.g., transaction 924a), for example, a reference that identifies an output of a prior transaction that is input to the transaction 924a, an attachment, and a command. Each of the non-leaf nodes of node 932a and node 932b can contain a hash of the hashes of its child nodes (e.g., leaf nodes such as node 928a and node 928b). In this example, node 932a can contain a hash of the hashes contained in node 928a, node 928b and node 932b can contain a hash of the hashes contained in node 928c, node 928d. The root node, which includes (e.g., contains) transactions root hash 916b, can contain a hash of the hashes of child nodes 932a-b.

A Merkle tree representation of a transaction (e.g., transaction 924a) allows an entity needing access to the transaction 924a to be provided with only a portion that includes the components that the entity needs. For example, if an entity needs only the transaction summary, the entity can be provided with the nodes (and each node's sibling nodes) along the path from the root node to the node of the hash of the transaction summary. The entity can confirm that the transaction summary is that used in the transaction 924a by generating a hash of the transaction summary and calculating the hashes of the nodes along the path to the root node. If the calculated hash of the root node matches the hash of node 928a of the transaction 924a, the transaction summary is confirmed as the one used in the transaction. Because only the portion of the Merkle tree relating to components that an entity needs is provided, the entity will not have access to other components. Thus, the confidentiality of the other components is not compromised.

To transfer ownership of a digital asset, such as a bitcoin, using the blockchain system 900, a new transaction, such as one of transactions 924*a-d*, is generated and added to a stack of transactions in a block, e.g., block 904*b*. To record a transaction in a blockchain, each party and asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (i.e., the current owner) creates a transaction (e.g., transaction 924*a*) against the account for the asset that indicates that the transaction 924*a* is a transfer of ownership and outputs a token identifying the second user as the next owner and a token identifying the asset. The transaction 924*a* is signed by the private key of the first user (i.e., the current owner), and the transaction 924*a* is evidence that the second user is now the new current owner, and that ownership has been transferred from the first to the second user.

The transaction 924*a* (e.g., a new transaction), which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the transaction 924*a* (e.g., the new transaction). Once the block is full, the block is "capped" with a block header, that is, a hash digest of all the transaction identifiers within the block. The block header is recorded as the first transaction in the next block in the chain, creating a mathematical hierarchy called the "blockchain." To verify the current owner, the blockchain 904 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, in some embodiments, the blockchain system 900 uses one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 924*a-d*) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 924*a* in the blockchain 904 using a token that is a hash of node 928*a* of the computer code so that the computer code that is executed can be authenticated. When deployed, a constructor of the smart contract executes, initializing the smart contract and its state. The state of a smart contract is stored persistently in the blockchain 904. When a transaction 924*a* is recorded against a smart contract, a message is sent to the smart contract, and the computer code of the smart contract executes to implement the transaction (e.g., debit a certain amount from the balance of an account). The computer code ensures that all the terms of the contract are complied with before the transaction 924*a* is recorded in the blockchain 904.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., transaction 924*a*) that transfers the ownership of the asset to the buyer and a transaction (e.g., transaction 924*b*) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either of transaction 924*a* or transaction 924*b* is not successful, neither transaction is recorded.

When a message is sent to a smart contract to record a transaction 924*a*, the message is sent to each node that maintains a replica of the blockchain 904. Each node executes the computer code of the smart contract to implement the transaction 924*a*. For example, if a hundred nodes each maintain a replica of the blockchain 904, the computer code executes at each of the hundred nodes. When a node completes execution of the computer code, the result of the transaction 924*a* is recorded in the blockchain 904. The nodes employ a consensus algorithm to decide which transactions (e.g., transaction 924*c*) to keep and which transactions (e.g., transaction 924*d*) to discard. Although the execution of the computer code at each node helps ensure the authenticity of the blockchain 904, large amounts of computer resources are required to support such redundant execution of computer code.

Although blockchains can effectively store transactions 924*a-d*, the large amount of computer resources, such as storage and computational power, needed to maintain all the replicas of the blockchain can be problematic. To overcome this problem, some systems for storing transactions 924*a-d* do not use blockchains, but rather have each party to a transaction maintain its own copy of the transaction 924*a*. One such system is the Corda™ system developed by R3™ that provides a decentralized distributed ledger platform in which each participant in the platform has a node (e.g., computer system) that maintains its portion of the distributed ledger.

When parties agree on the terms of a transaction 924*a*, a party submits the transaction 924*a* to a notary, which is a trusted node, for notarization. The notary maintains a consumed output database of transaction outputs that have been input into other transactions. When a transaction 924*a* is received, the notary checks the inputs to the transaction 924*a* against the consumed output database to ensure that the outputs that the inputs reference have not been spent. If the inputs have not been spent, the notary updates the consumed output database to indicate that the referenced outputs have been spent, notarizes the transaction 924*a* (e.g., by signing the transaction or a transaction identifier with a private key of the notary), and sends the notarized transaction to the party that submitted the transaction 924*a* for notarization. When the party receives the notarized transaction, the party stores the notarized transaction and provides the notarized transaction to the counterparties.

In embodiments, a notary is a non-validating notary or a validating notary. When a non-validating notary is to notarize a transaction (e.g., transaction 924*b*), the non-validating notary determines that the prior output of a prior transaction (e.g., transaction 924a), that is, the input of a current transaction, e.g., transaction 924b, has not been consumed. If the prior output has not been consumed, the non-validating notary notarizes the transaction 924b by signing a hash of node 928b of the transaction. To notarize a transaction 924b, a non-validating notary needs only the identification of the prior output (e.g., the hash of node 928a of the prior transaction (e.g., transaction 924a) and the index of the output) and the portion of the Merkle tree needed to calculate the hash of node 928b of the transaction 924b.

As described herein, in some embodiments, the blockchain system 900 uses one or more smart contracts to enable more complex transactions. For example, a validating notary validates a transaction (e.g., transaction 924d), which includes verifying that prior transactions 924a-c in a backchain of transactions are valid. The backchain refers to the collection of prior transactions (e.g., transaction 924c) of a transaction 924d, as well as prior transactions of transaction 924a, transaction 924b, and transaction 924c, and so on. To validate a transaction 924d, a validating notary invokes validation code of the transaction 924d. In one example, a validating notary invokes validation code of a smart contract of the transaction 924d. The validation code performs whatever checks are needed to comply with the terms applicable to the transaction 924d. This checking can include retrieving the public key of the owner from the prior transaction (e.g., transaction 924c) (pointed to by the input state of the transaction 924d) and checks the signature of the transaction 924d, ensuring that the prior output of a prior transaction that is input has not been consumed, and checking the validity of each transaction (e.g., transaction 924c) in the backchain of the transactions. If the validation code indicates that the transaction 924d is valid, the validating notary notarizes the transaction 924d and records the output of the prior transaction (e.g., transaction 924c) as consumed.

In some examples, to verify that the transactions 924a-d in a ledger stored at a node are correct, the blocks, e.g., block 904a, block 904b, block 904c in the blockchain 904 can be accessed from oldest block (e.g., block 904a) to newest block (e.g., block 904c), generating a new hash of the block 904c and comparing the new hash to the hash 908c generated when the block 904c was created. If the hashes are the same, then the transactions in the block are verified. In one example, the Bitcoin system also implements techniques to ensure that it would be infeasible to change a transaction 924a and regenerate the blockchain 904 by employing a computationally expensive technique to generate a nonce 920b that is added to the block when it is created. A bitcoin ledger is sometimes referred to as an Unspent Transaction Output ("UTXO") set because it tracks the output of all transactions that have not yet been spent.

In some embodiments, a self-sovereign identity (SSI) approach to digital identity is used that gives individuals control over the information they use to prove who they are to websites, services, and applications across the web. In an SSI system, the user accesses services in a streamlined and secure manner, while maintaining control over the information associated with their identity. SSI addresses the difficulty of establishing trust in an interaction. In order to be trusted, one party in an interaction will present credentials to the other parties, and those relying on parties can verify that the credentials came from an issuer that they trust. In this way, the verifier's trust in the issuer is transferred to the credential holder. This basic structure of SSI with three participants is sometimes called "the trust triangle". For an identity system to be self-sovereign, users control the verifiable credentials that they hold, and their consent is required to use those credentials. This reduces the unintended sharing of users' personal data.

In an SSI system, holders generate, and control unique identifiers called decentralized identifiers. Most SSI systems are decentralized, where the credentials are managed using crypto wallets and verified using public-key cryptography anchored on a distributed ledger. The credentials may contain data from an issuer's database, a social media account, a history of transactions on an e-commerce site, or attestation from friends or colleagues.

Figure 10A:
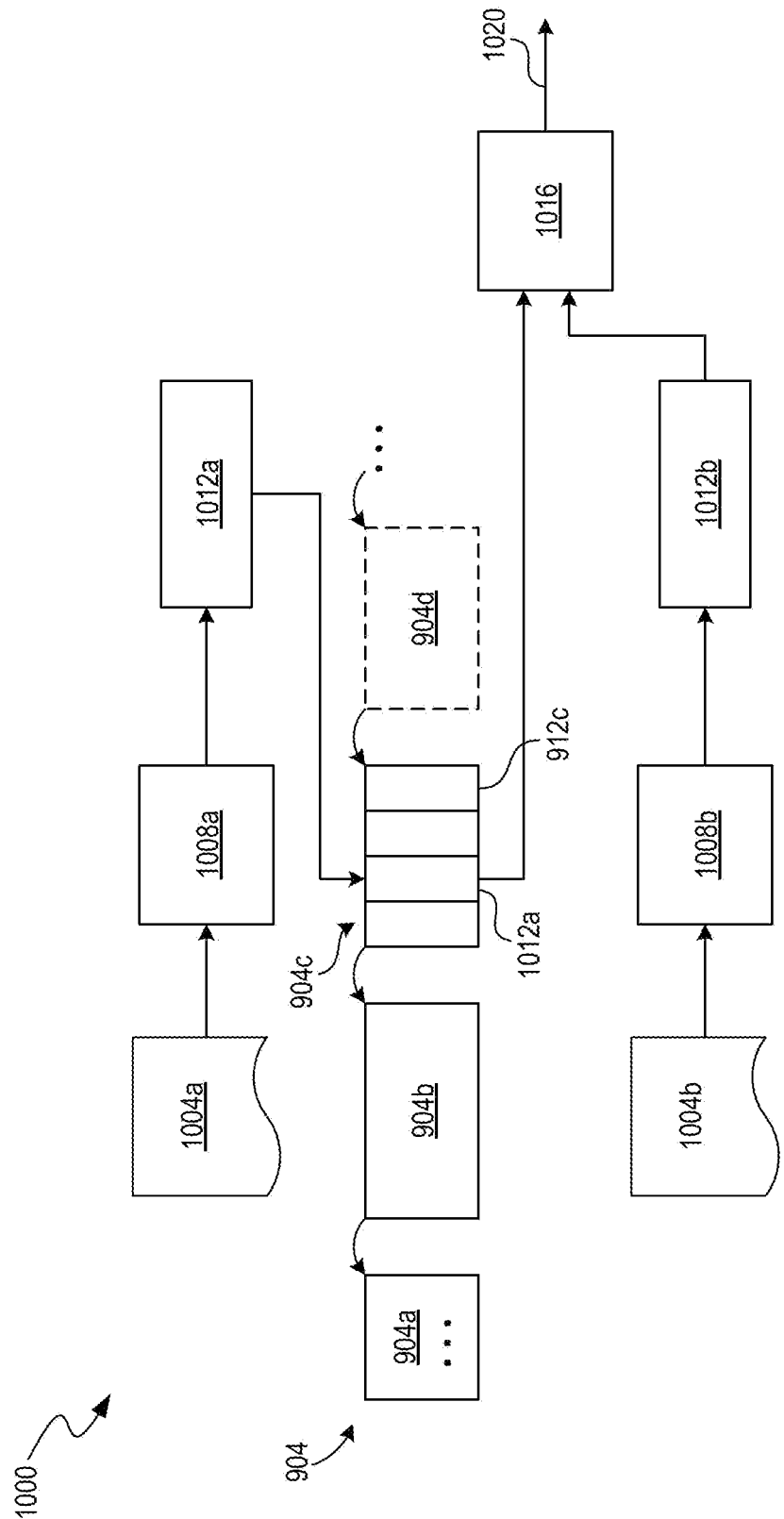
FIG. 10A is a drawing illustrating an application of a hash function, in accordance with one or more embodiments of this disclosure.

FIG. 10A is a drawing illustrating an example hash algorithm. The process 1000 shown by FIG. 10A uses a hash algorithm to generate a token or perform a cryptographic transaction on a blockchain. An example blockchain 904, e.g., as shown in FIG. 10A, is also illustrated, and described in detail with reference to FIG. 9. The process 1000 can be performed by a computer system such as that described with reference to FIG. 12 and/or by nodes of the blockchain 904. Some embodiments include different and/or additional steps or perform steps in different orders.

In embodiments, a digital message, electronic art, a digital collectible, any other form of digital content, or a combination thereof (e.g., digital content 1004a) can be hashed using hashing algorithm 1008a. The hashing algorithm 1008a (sometimes referred to as a "hash function") can be a function used to map data of arbitrary size (e.g., digital content 1004a) to fixed-size values (e.g., hash of values 1012a). The values 1012a that are returned by the hashing algorithm 1008a can be called hash values, hash codes, digests, or hashes. The values 1012a can be used to index a fixed-size table called a hash table. A hash table, also known as a hash map, is a data structure that implements an associative array or dictionary, which is an abstract data type that maps keys (e.g., digital content 1004a) to values 1012a.

The output of the hashed digital content (e.g., hash of values 1012a) can be inserted into a block (e.g., block 904c) of the blockchain 904 (e.g., comprising blocks such as blocks such as block 904a, block 904b, block 904c-). The block 904c can include, among other things, information such as timestamp 912c. In order to verify that the block 904c is correct, a new hash 1012b is generated by applying hashing algorithm 1008b to the digital content 1004b. The new hash 1012b is compared to the hash of values 1012a in the blockchain 904 at comparison step 1016. If the new hash 1012b is the same as the hash of values 1012a of the block 904c, the comparison yields an indication that they match. For example, the decision can indicate that the hashes of values 1012a-b are the same or not. The hashes can be indicated to be the same if the characters of the hash match. The hashing algorithms 1008a-b can include any suitable hashing algorithm. Examples include Message Digest 5 (MD5), Secure Hashing Algorithm (SHA) and/or the likes.

Components of the process 1000 can generate or validate an NFT, which is a cryptographic asset that has a unique identification code and metadata that uniquely identifies the NFT. In one example, the digital content 1004a can be hashed and minted to generate an NFT, or the digital content 1004a can represent an NFT that is verified using the process 1000 and the digital content 1004b. An NFT can include digital data stored in the blockchain 904. The ownership of an NFT is recorded in the blockchain 904 and transferrable by an owner, allowing the NFT to be sold and traded. The NFT contains a reference to digital files such as photos, videos, or audio (e.g., digital content 1004a). Because NFTs are uniquely identifiable assets, they differ from cryptocurrencies, which are fungible. In particular, NFTs function like cryptographic tokens, but unlike cryptocurrencies such as Bitcoin™ or Ethereum™, NFTs are not mutually interchangeable, and so are not fungible.

The NFT can be associated with a particular digital or physical asset such as images, art, music, and sport highlights and can confer licensing rights to use the asset for a specified purpose. As with other assets, NFTs are recorded on a blockchain when a blockchain 904 concatenates records containing cryptographic hashes—sets of characters that identify a set of data—onto previous records, creating a chain of identifiable data blocks such as block 904*a*, block 904*b*, block 904*c*, and block 904*d*. A cryptographic transaction process enables authentication of each digital file by providing a digital signature that tracks NFT ownership. In embodiments, a data link that is part of the NFT records points to details about where the associated art is stored.

Minting an NFT can refer to the process of turning a digital file (e.g., digital content 1104*a*) into a crypto collectible or digital asset on blockchain 904 (e.g., the Ethereum™ blockchain). The digital item or file (e.g., digital content 1004*a*) can be stored in the blockchain 1004 and cannot be able to be edited, modified, or deleted. The process of uploading a specific item onto the blockchain 904 is known as "minting." For example, "NFT minting" can refer to a process by which a digital art or digital content 1004*a* becomes a part of the Ethereum™ blockchain. Thus, the process turns digital content 1004*a* into a crypto asset, which is easily traded or bought with cryptocurrencies on a digital marketplace without an intermediary.

Figure 10B:
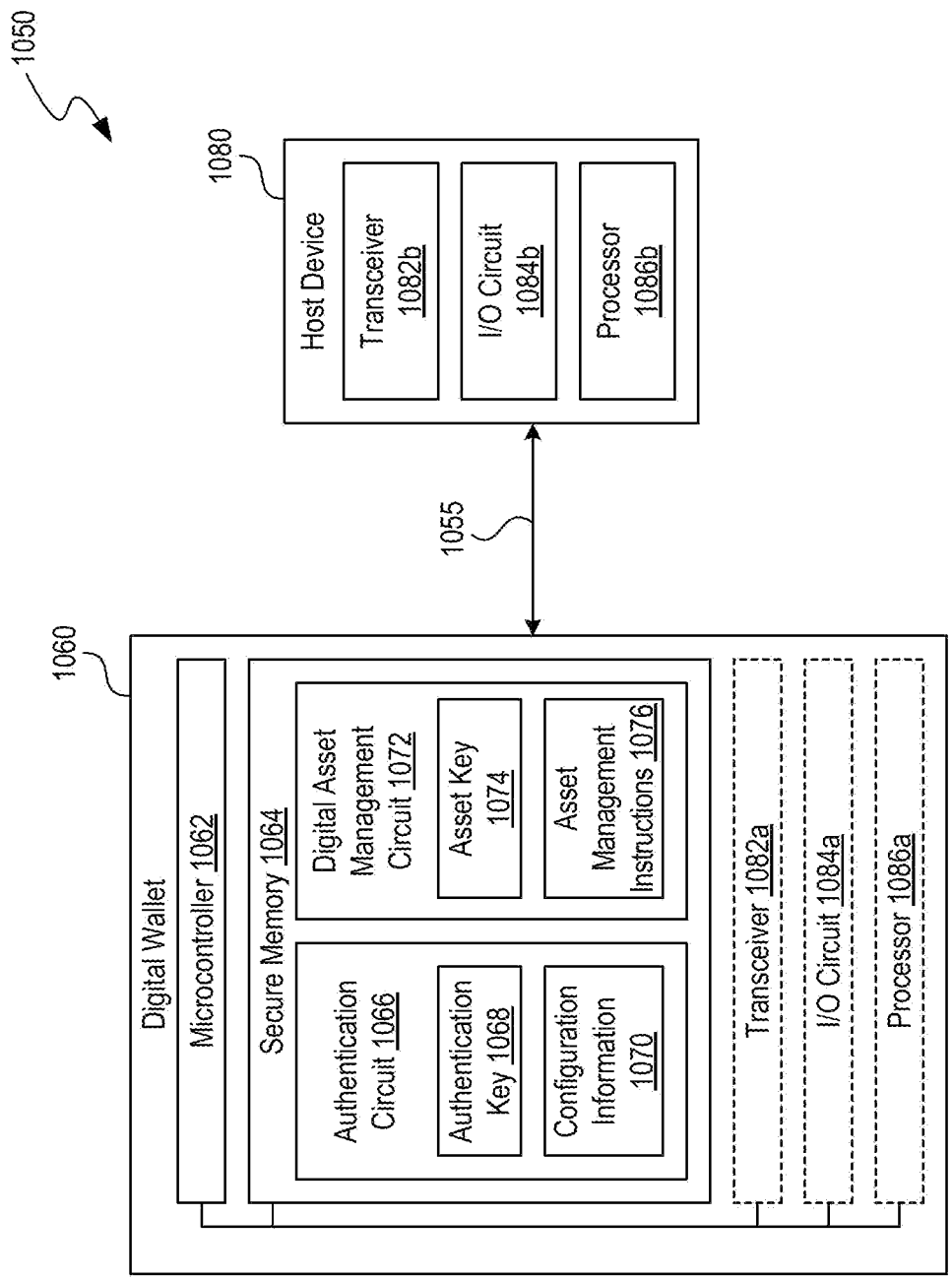
FIG. 10B is a block diagram illustrating an example cryptographic wallet, in accordance with one or more embodiments of this disclosure.

FIG. 10B is a block diagram 1050 illustrating an example cryptographic wallet 1060. As a general overview, cryptographic wallet 1060 is an electronic entity that allows users to securely manage digital assets. According to various embodiments, the cryptographic wallet 1060 can be a hardware-based wallet (e.g., can include dedicated hardware component(s)), a software-based wallet, or a combination thereof. Example digital assets that can be stored and managed using the cryptographic wallet 1060 include digital coins, digital tokens, and/or the like. In some embodiments, tokens are stored on a blockchain system, such as the blockchain system 900 described in FIG. 9. In some embodiments, the cryptographic wallet 1060 may be capable of connecting to and managing assets that are native to or associated with multiple, different blockchain systems (e.g., including multiple blockchain systems having structure similar to or equivalent to blockchain system 900).

As defined herein, the terms "coin" and "token" refer to a digital representation of a particular asset, utility, ownership interest, and/or access right. Any suitable type of coin or token can be managed using various embodiments of the cryptographic wallet 1060. In some embodiments, tokens include cryptocurrency, such as exchange tokens and/or stablecoins. Exchange tokens and/or stablecoins can be native to a particular blockchain system and, in some instances, can be backed by a value-stable asset, such as fiat currency, precious metal, oil, or another commodity. In some embodiments, tokens are utility tokens that provide access to a product or service rendered by an operator of the blockchain system 900 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership. In some embodiments, tokens are decentralized finance (DeFi) tokens. DeFi tokens can be used to access feature sets of DeFi software applications (dApps) built on the blockchain system 900. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system) or off-chain (e.g., implemented as computer software on computing devices that are separate from the blockchain system 900).

As shown, the cryptographic wallet 1060 of FIG. 10B is communicatively coupled to the host device 1080 (e.g., a mobile phone, a laptop, a tablet, a desktop computer, a wearable device, a point-of-sale (POS) terminal, an automated teller machine (ATM) and the like) via the communications link 1055. In some embodiments, the host device 1080 can extend the feature set available to the user of the cryptographic wallet 1060 when it is coupled to the host device 1080. For instance, the host device may provide the user with the ability to perform balance inquiries, convert tokens, access exchanges and/or marketplaces, perform transactions, access computing systems, and/or the like.

In some embodiments, the cryptographic wallet 1060 and the host device 1080 can be owned and/or operated by the same entity, user, or a group of users. For example, an individual owner of the cryptographic wallet 1060 may also operate a personal computing device that acts as a host device 1080 and provides enhanced user experience relative to the cryptographic wallet 1060 (e.g., by providing a user interface that includes graphical features, immersive reality experience, virtual reality experience, or similar). In some embodiments, the cryptographic wallet 1060 and the host device 1080 can be owned and/or operated by different entities, users and/or groups of users. For example, the host device 1080 can be a point-of-sale (POS) terminal at a merchant location, and the individual owner of the cryptographic wallet 1060 may use the cryptographic wallet 1060 as a method of payment for goods or services at the merchant location by communicatively coupling the two devices for a short period of time (e.g., via chip, via near-field communications (NFC), by scanning of a bar code, by causing the cryptographic wallet 1060 to generate and display a quick response (QR) code, and/or the like) to transmit payment information from the cryptographic wallet 1060 to the host device 1080.

The cryptographic wallet 1060 and the host device 1080 can be physically separate and/or capable of being removably coupled. The ability to uncouple the cryptographic wallet physically and communicatively 1060 from the host device 1080 and other devices enables the air-gapped cryptographic wallet (e.g., cryptographic wallet 1060) to act as "cold" storage, where the stored digital assets are moved offline and become inaccessible to the host device 1080 and other devices. Further, the ability to uncouple the cryptographic wallet physically and communicatively 1060 from the host device 1080 allows the cryptographic wallet 1060 to be implemented as a larger block of physical memory, which extends the storage capacity of the cryptographic wallet 1060, similar to a safety deposit box or vault at a brick-and-mortar facility.

Accordingly, in some embodiments, the cryptographic wallet 1060 and the host device 1080 are physically separate entities. In such embodiments, the communications link 1055 can include a computer network. For instance, the cryptographic wallet 1060 and the host device 1080 can be paired wirelessly via a short-range communications protocol (e.g., Bluetooth, ZigBee, infrared communication) or via another suitable network infrastructure. In some embodiments, the cryptographic wallet 1060 and the host device 1080 are removably coupled. For instance, the host device 1080 can include a physical port, outlet, opening, or similar to receive and communicatively couple to the cryptographic wallet 1060, directly or via a connector.

In some embodiments, the cryptographic wallet 1060 includes tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the cryptographic wallet 1060 can include an integrated circuit, such as a SIM card, a smart cart, and/or the like. For instance, in some embodiments, the cryptographic wallet 1060 can be a physical smart card that includes an integrated circuit, such as a chip that can store data. In some embodiments, the cryptographic wallet 1060 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the cryptographic wallet 1060 and the host device 1080 are non-removably coupled. For instance, various components of the cryptographic wallet 1060 can be co-located with components of the host device 1080 in the housing of the host device 1080. In such embodiments, the host device 1080 can be a mobile device, such as a phone, a wearable, or similar, and the cryptographic wallet 1060 can be built into the host device. The integration between the cryptographic wallet 1060 and the host device 1080 can enable improved user experience and extend the feature set of the cryptographic wallet 1060 while preserving computing resources (e.g., by sharing the computing resources, such as transceiver, processor, and/or display or the host device 1080). The integration further enables the ease of asset transfer between parties. The integration can further enhance loss protection options, as recovering a password or similar authentication information, rather than recovering a physical device, can be sufficient to restore access to digital assets stored in the cryptographic wallet 1060. In some embodiments, the non-removably coupled cryptographic wallet can be air-gapped by, for example, disconnecting the host device 1080 from the Internet.

As shown, the cryptographic wallet 1060 can include a microcontroller 1062. The microcontroller 1062 can include or be communicatively coupled to (e.g., via a bus or similar communication pathway) at least a secure memory 1064. The cryptographic wallet 1060 can further include a transceiver 1082a, and input/output circuit 1084a, and/or a processor 1086a. In some embodiments, however, some or all of these components can be omitted.

In some embodiments, the cryptographic wallet 1060 can include a transceiver 1082a and therefore can be capable of independently connecting to a network and exchanging electronic messages with other computing devices. In some embodiments, the cryptographic wallet 1060 does not include a transceiver 1082a. The cryptographic wallet 1060 can be capable of connecting to or accessible from a network, via the transceiver 1082b of the host device 1080, when the cryptographic wallet 1060 is docked to the host device 1080. For example, in some embodiments, the user of the cryptographic wallet 1060 can participate in token exchange activities on decentralized exchanges when the cryptographic wallet 1060 is connected to the host device 1080.

In some embodiments, the cryptographic wallet 1060 can include an input/output circuit 1084a, which may include user-interactive controls, such as buttons, sliders, gesture-responsive controls, and/or the like. The user-interactive controls can allow a user of the cryptographic wallet 1060 to interact with the cryptographic wallet 1060 (e.g., perform balance inquiries, convert tokens, access exchanges and/or marketplaces, perform transactions, access computing systems, and/or the like). In some embodiments, the user can access an expanded feature set, via the input/output circuit 1084b of the host device 1080, when the cryptographic wallet 1060 is docked to the host device 1080. For example, host device 1080 can include computer-executable code structured to securely access data from the secure memory 1064 of the cryptographic wallet 1060 and to perform operations using the data. The data can include authentication information, configuration information, asset keys, and/or token management instructions. The data can be used by an application that executes on or by the host device 1080. The data can be used to construct application programming interface (API) calls to other applications that require or use the data provided by cryptographic wallet 1060. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 1064 is shown to include an authentication circuit 1066 and a digital asset management circuit 1072. The authentication circuit 1066 and/or digital asset management circuit 1072 include computer-executable code that, when executed by one or more processors, such as one or more processors of processor 1086a and/or processor 1086b, performs specialized computer-executable operations. For example, the authentication circuit 1066 can be structured to cause the cryptographic wallet 1060 to establish, maintain and manage a secure electronic connection with another computing device, such as the host device 1080. The digital asset management circuit 1072 can be structured to cause the cryptographic wallet 1060 to allow a user to manage the digital assets accessible via the cryptographic wallet 1060. In some embodiments, the authentication circuit 1066 and the digital asset management circuit 1072 are combined in whole or in part.

As shown, the authentication circuit 1066 can include retrievably stored security, authentication, and/or authorization data, such as the authentication key 1068. The authentication key 1068 can be a numerical, alphabetic, or alphanumeric value or combination of values. The authentication key 1068 can serve as a security token that enables access to one or more computing systems, such as the host device

1080. For instance, in some embodiments, when the cryptographic wallet 1060 is paired or docked to (e.g., establishes an electronic connection with) the host device 1080, the user may be prompted to enter authentication information via the input/output circuit(s) of input/output circuit 1084a and/or input/output circuit 1084b. The authentication information may include a PIN, a password, a pass phrase, biometric information (e.g., fingerprint, a set of facial features, a retinal scan), a voice command, and/or the like. The authentication circuit 1066 can compare the user-entered information to the authentication key 1068 and maintain the electronic connection if the items match at least in part.

As shown, the authentication circuit 1066 can include retrievably stored configuration information such as configuration information 1070. The configuration information 1070 can include a numerical, alphabetic, or alphanumeric value or combination of values. These items can be used to enable enhanced authentication protocols. For instance, the configuration information 1070 can include a timeout value for an authorized connection between the cryptographic wallet 1060 and the host device 1080. The configuration information 1070 can also include computer-executable code. In some embodiments, for example, where a particular cryptographic wallet, such as cryptographic wallet 1060, is set up to pair with only one or a small number of pre-authorized host devices such as host device 1080, the configuration information 1070 can include a device identifier and/or other device authentication information, and the computer-executable code may be structured to verify the device identifier and/or other device authentication information against the information associated with or provided by the host device 1080. When a pairing is attempted, the computer-executable code may initiate or cause the host device 1080 to initiate an electronic communication (e.g., an email message, a text message, etc.) using user contact information stored as configuration information 1070.

As shown, the digital asset management circuit 1072 can include retrievably stored digital asset data, such as the asset key 1074. The asset key 1074 can be a numerical, alphabetic, or alphanumeric value or combination of values. In some embodiments, the asset key 1074 is a private key in a public/private key pair, a portion thereof, or an item from which the private key can be derived. Accordingly, the asset key 1074 proves ownership of a particular digital asset stored on a blockchain system 900. The asset key 1074 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The cryptographic wallet 1060 can be identified as a party to a blockchain transaction on the blockchain system 900 using a unique cryptographically generated address (e.g., the public key in the public/private key pair).

As shown, the digital asset management circuit 1072 can also include retrievably stored asset management instructions such as asset management instructions 1076. The asset management instructions 1076 can include a numerical, alphabetic, or alphanumeric value or combination of values. These items can be used to enable computer-based operations related to managing digital assets identified by the asset key 1074. For instance, the asset management instructions 1076 can include parameter values, metadata, and/or similar values associated with various tokens identified by the asset key 1074 and/or by the blockchain system 900 associated with particular tokens. The asset management instructions 1076 can also include computer-executable code. In some embodiments, for example, asset management functionality (e.g., balance inquiry and the like) can be executable directly from the cryptographic wallet 1060 rather than or in addition to being executable from the host device 1080.

Figure 11:
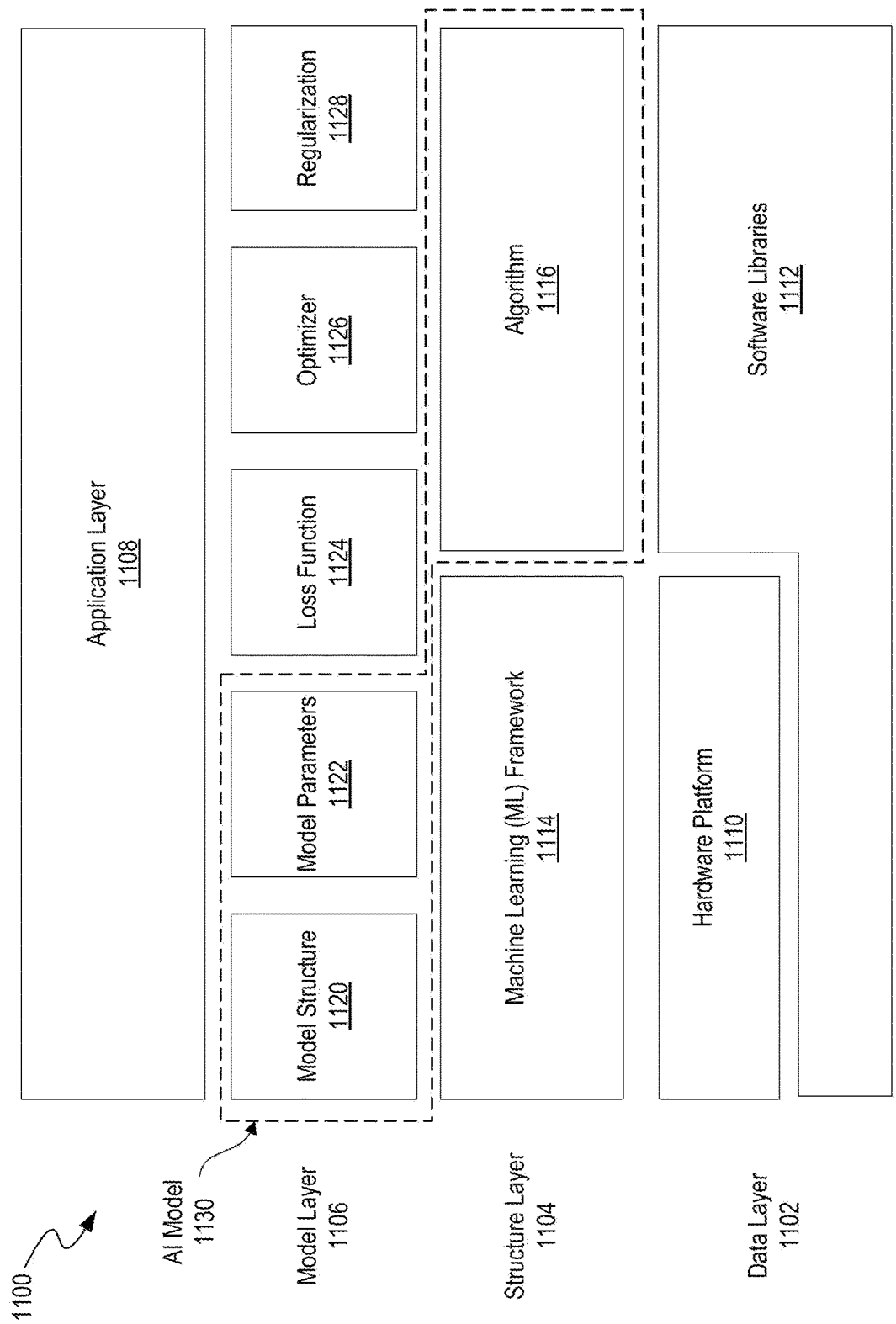
FIG. 11 is a block diagram illustrating an example artificial intelligence (AI) system, in accordance with one or more embodiments of this disclosure.

FIG. 11 is a block diagram illustrating an example artificial intelligence (AI) system 1100, in accordance with one or more embodiments of this disclosure. The AI system 1100 is implemented using components of the example computer system 1200 illustrated and described in more detail with reference to FIG. 12. For example, the AI system 1100 can be implemented using the processor 1202 and instructions 1208 programmed in the memory 1206 illustrated and described in more detail with reference to FIG. 12. Likewise, implementations of the AI system 1100 can include different and/or additional components or be connected in different ways.

As shown, the AI system 1100 can include a set of layers, which conceptually organize elements within an example network topology for the AI system's architecture to implement a particular AI model 1130. Generally, an AI model 1130 is a computer-executable program implemented by the AI system 1100 that analyzes data to make predictions. Information can pass through each layer of the AI system 1100 to generate outputs for the AI model 1130. The layers can include a data layer 1102, a structure layer 1104, a model layer 1106, and an application layer 1108. The algorithm 1116 of the structure layer 1104 and the model structure 1120 and model parameters 1122 of the model layer 1106 together form the example AI model 1130. The optimizer 1126, loss function engine 1124, and regularization engine 1128 work to refine and optimize the AI model 1130, and the data layer 1102 provides resources and support for application of the AI model 1130 by the application layer 1108.

The data layer 1102 acts as the foundation of the AI system 1100 by preparing data for the AI model 1130. As shown, the data layer 1102 can include two sub-layers: a hardware platform 1110 and one or more software libraries 1112. The hardware platform 1110 can be designed to perform operations for the AI model 1130 and include computing resources for storage, memory, logic, and networking, such as the resources described in relation to FIG. 12. The hardware platform 1110 can process amounts of data using one or more servers. The servers can perform backend operations such as matrix calculations, parallel calculations, machine learning (ML) training, and the like. Examples of servers used by the hardware platform 1110 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1110 can include Infrastructure as a Service (IaaS) resources, which are computing resources, (e.g., servers, memory, etc.) offered by a cloud services provider. The hardware platform 1110 can also include computer memory for storing data about the AI model 1130, application of the AI model 1130, and training data for the AI model 1130. The computer memory can be a form of random-access memory (RAM), such as dynamic RAM, static RAM, and non-volatile RAM.

The software libraries 1112 can be thought of as suites of data and programming code, including executables, used to control the computing resources of the hardware platform 1110. The programming code can include low-level primitives (e.g., fundamental language elements) that form the foundation of one or more low-level programming languages, such that servers of the hardware platform 1110 can use the low-level primitives to carry out specific operations. The low-level programming languages do not require much, if any, abstraction from a computing resource's instruction set architecture, allowing them to run quickly with a small memory footprint. Examples of software libraries 1112 that can be included in the AI system 1100 include Intel Math Kernel Library, Nvidia cuDNN, Eigen, and Open BLAS.

The structure layer 1104 can include a machine learning (ML) framework 1114 and an algorithm 1116. The ML framework 1114 can be thought of as an interface, library, or tool that allows users to build and deploy the AI model 1130. The ML framework 1114 can include an open-source library, an application programming interface (API), a gradient-boosting library, an ensemble method, and/or a deep learning toolkit that work with the layers of the AI system facilitate development of the AI model 1130. For example, the ML framework 1114 can distribute processes for application or training of the AI model 1130 across multiple resources in the hardware platform 1110. The ML framework 1114 can also include a set of pre-built components that have the functionality to implement and train the AI model 1130 and allow users to use pre-built functions and classes to construct and train the AI model 1130. Thus, the ML framework 1114 can be used to facilitate data engineering, development, hyperparameter tuning, testing, and training for the AI model 1130.

Examples of ML frameworks 1114 or libraries that can be used in the AI system 1100 include TensorFlow, PyTorch, Scikit-Learn, Keras, and Cafffe. Random Forest is a machine learning algorithm that can be used within the ML frameworks 1114. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some embodiments, the ML framework 1114 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 1100. For example, the ML framework 1114 can use a cascade of multiple layers of nonlinear processing units for implicit feature extraction and transformation. Each successive layer uses the output from the previous layer as input. The AI model 1130 can thus learn in supervised (e.g., classification) and/or unsupervised (e.g., pattern analysis) modes. The AI model 1130 can learn multiple levels of representations that correspond to different levels of abstraction, wherein the different levels form a hierarchy of concepts. In this manner, AI model 1130 can be configured to differentiate features of interest from background features.

The algorithm 1116 can be an organized set of computer-executable operations used to generate output data from a set of input data and can be described using pseudocode. The algorithm 1116 can include complex code that allows the computing resources to learn from new input data and create new/modified outputs based on what was learned. In some implementations, the algorithm 1116 can build the AI model 1130 through being trained while running computing resources of the hardware platform 1110. This training allows the algorithm 1116 to make predictions or decisions without being explicitly programmed to do so. Once trained, the algorithm 1116 can run at the computing resources as part of the AI model 1130 to make predictions or decisions, improve computing resource performance, or perform tasks. The algorithm 1116 can be trained using supervised learning, unsupervised learning, semi-supervised learning, and/or reinforcement learning.

Using supervised learning, the algorithm 1116 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include data received from user equipment. The user may label the training data based on one or more classes and trains the AI model 1130 by inputting the training data to the algorithm 1116. The algorithm determines how to label the new data based on the labeled training data. The user can facilitate collection, labeling, and/or input via the ML framework 1114. In some instances, the user may convert the training data to a set of feature vectors for input to the algorithm 1116. Once trained, the user can test the algorithm 1116 on new data to determine if the algorithm 1116 is predicting accurate labels for the new data. For example, the user can use cross-validation methods to test the accuracy of the algorithm 1116 and retrain the algorithm 1116 on new training data if the results of the cross-validation are below an accuracy threshold.

Supervised learning can involve classification and/or regression. Classification techniques involve teaching the algorithm 1116 to identify a category of new observations based on training data and are used when input data for the algorithm 1116 is discrete. Said differently, when learning through classification techniques, the algorithm 1116 receives training data labeled with categories (e.g., classes) and determines how features observed in the training data (e.g., RAN resources) relate to the categories (e.g., services and applications). Once trained, the algorithm 1116 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1116 is continuous. Regression techniques can be used to train the algorithm 1116 to predict or forecast relationships between variables. To train the algorithm 1116 using regression techniques, a user can select a regression method for estimating the parameters of the model. The user collects and labels training data that is input to the algorithm 1116 such that the algorithm 1116 is trained to understand the relationship between data features and the dependent variable(s). Once trained, the algorithm 1116 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1116 learns patterns from unlabeled training data. In particular, the algorithm 1116 is trained to learn hidden patterns and insights of input data, which can be used for data exploration or for generating new data. Here, the algorithm 1116 does not have a predefined output, unlike the labels output when the algorithm 1116 is trained using supervised learning. Another way unsupervised learning is used to train the algorithm 1116 to find an underlying structure of a set of data is to group the data according to similarities and represent that set of data in a compressed format. The XR system 700 disclosed herein can use unsupervised learning to identify patterns in data received from the network (e.g., to identify features for different XR environments) and so forth. In some implementations, performance of the XR system 700 using unsupervised learning is improved by improving the video provided to the computer system of the XR device, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1116 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1116 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 1116 include factor analysis, item response theory, latent profile analysis, and latent class analysis.

In some embodiments, the AI system 1100 trains the algorithm 1116 of AI model 1130, based on the training data, to correlate the feature vector to expected outputs in the training data. As part of the training of the AI model 1130, the AI system 1100 forms a training set of features and training labels by identifying a positive training set of features that have been determined to have a desired property in question, and, in some embodiments, forms a negative training set of features that lack the property in question. The AI system 1100 applies ML framework 1114 to train the AI model 1130, that when applied to the feature vector, outputs indications of whether the feature vector has an associated desired property or properties, such as a probability that the feature vector has a particular Boolean property, or an estimated value of a scalar property. The AI system 1100 can further apply dimensionality reduction (e.g., via linear discriminant analysis (LDA), PCA, or the like) to reduce the amount of data in the feature vector to a smaller, more representative set of data.

The model layer 1106 implements the AI model 1130 using data from the data layer and the algorithm 1116 and ML framework 1114 from the structure layer 1104, thus enabling decision-making capabilities of the AI system 1100. The model layer 1106 includes a model structure 1120, model parameters 1122, a loss function engine 1124, an optimizer 1126, and a regularization engine 1128.

The model structure 1120 describes the architecture of the AI model 1130 of the AI system 1100. The model structure 1120 defines the complexity of the pattern/relationship that the AI model 1130 expresses. Examples of structures that can be used as the model structure 1120 include decision trees, support vector machines, regression analyses, Bayesian networks, Gaussian processes, genetic algorithms, and artificial neural networks (or, simply, neural networks). The model structure 1120 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1120 may include one or more hidden layers of nodes between the input and output layers. The model structure 1120 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1122 represent the relationships learned during training and can be used to make predictions and decisions based on input data. The model parameters 1122 can weight and bias the nodes and connections of the model structure 1120. For instance, when the model structure 1120 is a neural network, the model parameters 1122 can weight and bias the nodes in each layer of the neural networks, such that the weights determine the strength of the nodes and the biases determine the thresholds for the activation functions of each node. The model parameters 1122, in conjunction with the activation functions of the nodes, determine how input data is transformed into desired outputs. The model parameters 1122 can be determined and/or altered during training of the algorithm 1116.

The loss function engine 1124 can determine a loss function, which is a metric used to evaluate the AI model's 1130 performance during training. For instance, the loss function engine 1124 can measure the difference between a predicted output of the AI model 1130 and the actual output of the AI model 1130 and is used to guide optimization of the AI model 1130 during training to minimize the loss function. The loss function may be presented via the ML framework 1114, such that a user can determine whether to retrain or otherwise alter the algorithm 1116 if the loss function is over a threshold. In some instances, the algorithm 1116 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1126 adjusts the model parameters 1122 to minimize the loss function during training of the algorithm 1116. In other words, the optimizer 1126 uses the loss function generated by the loss function engine 1124 as a guide to determine what model parameters lead to the most accurate AI model 1130. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1126 used may be determined based on the type of model structure 1120 and the size of data and the computing resources available in the data layer 1102.

The regularization engine 1128 executes regularization operations. Regularization is a technique that prevents over- and under-fitting of the AI model 1130. Overfitting occurs when the algorithm 1116 is overly complex and too adapted to the training data, which can result in poor performance of the AI model 1130. Underfitting occurs when the algorithm 1116 is unable to recognize even basic patterns from the training data such that it cannot perform well on training data or on validation data. The regularization engine 1128 can apply one or more regularization techniques to fit the algorithm 1116 to the training data properly, which helps constraint the resulting AI model 1130 and improves its ability for generalized application. Examples of regularization techniques include lasso (L1) regularization, ridge (L2) regularization, and elastic (L1 and L2 regularization).

In some embodiments, the AI system 1100 can include a feature extraction module implemented using components of the example computer system 1200 illustrated and described in more detail with reference to FIG. 12. In some embodiments, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 1130 by using this reduced representation. In some example embodiments, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

The application layer 1108 describes how the AI system 1100 is used to solve problems or perform tasks. In an example implementation, the application layer 1108 can include the XR application of the XR system 700 illustrated and described in more detail with reference to FIG. 7. Referring still to the example implementation, the XR system 700 can include an AI platform with a plurality of environment-type-specific AI modules. The environment-type-specific AI modules can include the AI system 1100 and can be applied to the image/video data of the environment to provide environmental mapping. The environment-type-specific AI modules can be trained using environment-type grouped data sets, including environment-type mappings. Environment-type mappings can include layers based on the environment type. For example, a mall mapping can include layers showing features such as people, baggage, and vehicles. A home mapping can include layers showing landscaping, patios, walls, etc. The user can select layers, data sets, and mapping information to be added or removed from the environment-type data. The use of the AI system 1100 in the XR system 700 is described in more detail with reference to FIG. 7.

Figure 12:
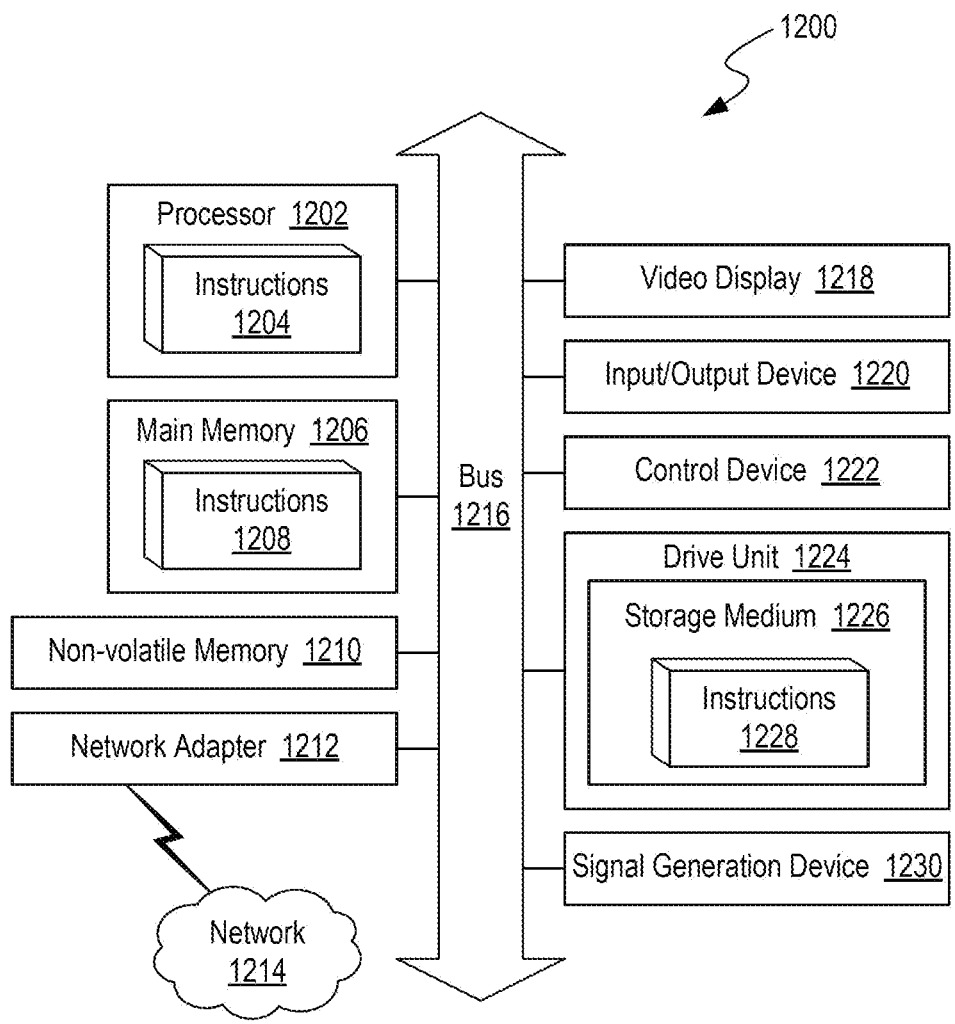
FIG. 12 is a block diagram illustrating an example computer system, in accordance with one or more embodiments of this disclosure.

FIG. 12 is a block diagram illustrating an example computer system 1200, in accordance with one or more embodiments. In some embodiments, components of the example computer system 1200 are used to implement the blockchain system 900 or the AI system 1100 illustrated and described in more detail with reference to FIGS. 9 and 11. At least some operations described herein can be implemented on the computer system 1200.

The computer system 1200 can include one or more central processing units ("processors") such as one or more processors 1202, and can further include main memory 1206, non-volatile memory 1210, network adapter 1212 (e.g., network interface), video displays 1218, input/output devices 1220, control devices 1222 (e.g., keyboard and pointing devices), drive units 1224 including a storage medium 1226, and a signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1294 bus (also referred to as "Firewire").

The computer system 1200 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1200.

While the main memory 1206, non-volatile memory 1210, and storage medium 1226 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1228. The term "machine-readable medium" and "storage medium" shall also be taken to include any medium that is capable of storing, encoding, or carrying a set of instructions for execution by the computer system 1200.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1204, 1208, 1228) set at various times in various memory and storage devices in a computer device. When read and executed by the one or more processors 1302, the instruction(s) cause the computer system 1200 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and/or nonvolatile memory 1210, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1212 enables the computer system 1200 to mediate data in a network 1214 with an entity that is external to the computer system 1200 through any communication protocol supported by the computer system 1200 and the external entity. The network adapter 1212 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1212 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A computer-implemented method comprising:
   determining, by a first computer system, first characteristics of a first communication channel and second characteristics of a second communication channel usable by a camera;
   determining, using an artificial intelligence (AI) module and based on a feature vector extracted from the first characteristics and the second characteristics, that the second communication channel provides enhanced transfer of video from the camera to a second computer system compared to the first communication channel;
   adjusting, based on the determining that the second communication channel provides the enhanced transfer of video, operation of the camera to switch from using the first communication channel to the second communication channel; and
   providing the enhanced transfer of video to the second computer system using the second communication channel.

2. The method of claim 1, further comprising:
   receiving a request for access to the enhanced transfer of video,
      wherein the request:
         (i) includes a credential stored in a digital wallet and/or (ii) uses self-sovereign identity (SSI).

3. The method of claim 1, wherein determining that the second communication channel provides the enhanced transfer of video further comprises determining that the second communication channel has a higher bit rate and/or higher frequencies in a frequency band than that of the first communication channel.

4. The method of claim 1, wherein adjusting the operation of the camera to switch from the first communication channel to the second communication channel further comprises adjusting an encoding type of the camera from a first encoding type to a second encoding type, the first encoding type and the second encoding type providing the enhanced transfer of video at different bit rates.

5. The method of claim 1, wherein providing the enhanced transfer of video to the second computer system further comprises providing the enhanced transfer of video to a cloud server communicably coupling the first computer system to the second computer system, and wherein the second computer system is an extended-reality (XR) device executing an XR application.

6. The method of claim 5, further comprising:
training an artificial intelligence (AI) model of the AI module, based on training data, using an XR simulation,
wherein the AI model is trained to increase at least one performance metric of the XR application.

7. The method of claim 5, wherein the enhanced transfer of video is a first video provided to the XR device for combining the first video with a second video, produced by a camera of the XR device, into an XR video for display on an electronic display of the XR device by the XR application.

8. The method of claim 7, wherein the XR video is associated with an electronic game, and wherein the electronic game is associated with a blockchain.

9. A base station, comprising:
one or more processors; and
memory storing instructions, wherein the processor is configured to execute the instructions such that the processor and memory are configured to:
determine first characteristics of a first communication channel and second characteristics of a second communication channel usable by a camera;
determine, using an artificial intelligence (AI) module and based on a feature vector extracted from the first characteristics and the second characteristics, that the second communication channel provides enhanced transfer of video from the camera to a second computer system compared to the first communication channel;
adjust, based on the determining that the second communication channel provides the enhanced transfer of video, operation of the camera to switch from using the first communication channel to the second communication channel; and
provide the enhanced transfer of video to the second computer system using the second communication channel.

10. The base station of claim 9, wherein the instructions when executed by the processor configure the processor and memory to:
receive a request for access to the enhanced transfer of video,
wherein the request:
(i) includes a credential stored in a digital wallet and/or (ii) uses self-sovereign identity (SSI).

11. The base station of claim 9, wherein the instructions determine that the second communication channel provides the enhanced transfer of video by configuring the processor and memory to determine that the second communication channel has a higher bit rate and/or higher frequencies in a frequency band than that of the first communication channel.

12. The base station of claim 9, wherein the instructions adjust the operation of the camera to switch from the first communication channel to the second communication channel by configuring the processor and memory to adjust an encoding type of the camera from a first encoding type to a second encoding type, the first encoding type and the second encoding type providing the enhanced transfer of video at different bit rates.

13. The base station of claim 9, wherein the instructions provide the enhanced transfer of video to the second computer system by configuring the processor and memory to provide the enhanced transfer of video to a cloud server communicably coupling the base station to the second computer system, and wherein the second computer system is an extended-reality (XR) device executing an XR application.

14. The base station of claim 13, wherein the instructions when executed by the processor configure the processor and memory to:
train an artificial intelligence (AI) model of the AI module, based on training data, using an XR simulation,
wherein the AI model is trained to increase at least one performance metric of the XR application.

15. The base station of claim 13, wherein the enhanced transfer of video is a first video provided to the XR device for combining the first video with a second video, produced by a camera of the XR device, into an XR video for display on an electronic display of the XR device by the XR application.

16. The base station of claim 15, wherein the XR video is associated with an electronic game, and wherein the electronic game is associated with a blockchain.

17. A non-transitory, computer-readable storage medium storing computer instructions, which when executed by one or more computer processors cause the one or more computer processors to:
determine first characteristics of a first communication channel and second characteristics of a second communication channel usable by a camera;
determine, using an artificial intelligence (AI) module and based on a feature vector extracted from the first characteristics and the second characteristics, that the second communication channel provides enhanced transfer of video from the camera to a second computer system compared to the first communication channel;
adjust, based on the determining that the second communication channel provides the enhanced transfer of video, operation of the camera to switch from using the first communication channel to the second communication channel; and
provide the enhanced transfer of video to the second computer system using the second communication channel.

18. The non-transitory, computer-readable storage medium of claim 17, wherein the computer instructions cause the one or more computer processors to:
receive a request for access to the enhanced transfer of video,
wherein the request:
(i) includes a credential stored in a digital wallet and/or (ii) uses self-sovereign identity (SSI).

19. The non-transitory, computer-readable storage medium of claim 17, wherein the computer instructions determine that the second communication channel provides the enhanced transfer of video by causing the one or more computer processors to determine that the second communication channel has a higher bit rate and/or higher frequencies in a frequency band than that of the first communication channel.

20. The non-transitory, computer-readable storage medium of claim 17, wherein the computer instructions adjust the operation of the camera to switch from the first communication channel to the second communication channel by causing the one or more computer processors to adjust an encoding type of the camera from a first encoding type to a second encoding type, the first encoding type and the second encoding type providing the enhanced transfer of video at different bit rates.

\* \* \* \* \*